(12) United States Patent
Nakashima et al.

(10) Patent No.: US 10,369,922 B2
(45) Date of Patent: Aug. 6, 2019

(54) VEHICLE HEADLIGHT DEVICE

(71) Applicant: TOYOTA JIDOSHA KABUSHIKI KAISHA, Toyota-shi, Aichi-ken (JP)

(72) Inventors: Kazuhiko Nakashima, Miyoshi (JP); Tomonari Sawada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 156 days.

(21) Appl. No.: 15/240,026

(22) Filed: Aug. 18, 2016

(65) Prior Publication Data

US 2017/0050556 A1 Feb. 23, 2017

(30) Foreign Application Priority Data

Aug. 21, 2015 (JP) .................. 2015-164288

(51) Int. Cl.
*B60Q 1/08* (2006.01)
*B60Q 1/14* (2006.01)
(Continued)

(52) U.S. Cl.
CPC ............. *B60Q 1/143* (2013.01); *B60Q 1/085* (2013.01); *F21S 41/14* (2018.01); *F21S 41/143* (2018.01); *F21S 41/16* (2018.01); *F21S 41/663* (2018.01); *B60Q 2300/056* (2013.01); *B60Q 2300/32* (2013.01); *B60Q 2300/41* (2013.01); *B60Q 2300/42* (2013.01); *B60Q 2300/45* (2013.01); *B60Q 2400/50* (2013.01); *F21S 41/255* (2018.01); *F21Y 2103/10* (2016.08); *F21Y 2113/00* (2013.01)

(58) Field of Classification Search
None
See application file for complete search history.

(56) References Cited

U.S. PATENT DOCUMENTS

2007/0147055 A1 6/2007 Komatsu
2011/0122638 A1 5/2011 Konishi
(Continued)

FOREIGN PATENT DOCUMENTS

CN 101008481 A 8/2007
JP 2009-227088 A 10/2009
(Continued)

*Primary Examiner* — Jimmy T Vu
*Assistant Examiner* — Laura Yesildag
(74) *Attorney, Agent, or Firm* — Oliff PLC

(57) ABSTRACT

A vehicle headlight device includes: a sensor acquiring information on an object in front of a host vehicle; a first lighting; a second lighting including a laser light, a movable mirror element reflecting the laser light, and an actuator driving the movable mirror element; and at least one processor that controls a light distribution pattern formed by the first lighting such that an irradiation suppressed site where the irradiation by the first lighting is reduced is included in a dark region where the irradiation by the first lighting is reduced, the irradiation suppressed site including at least a part of an irradiation suppression target object, set a laser light distribution pattern in a region not including the irradiation suppressed site and included in the dark region, and control the actuator such that the laser light is reflected in the laser light distribution pattern.

12 Claims, 23 Drawing Sheets

(51) Int. Cl.
      *F21S 41/14*       (2018.01)
      *F21S 41/16*       (2018.01)
      *F21S 41/143*      (2018.01)
      *F21S 41/255*      (2018.01)
      *F21S 41/663*      (2018.01)
      *F21Y 113/00*      (2016.01)
      *F21Y 103/10*      (2016.01)

(56) References Cited

U.S. PATENT DOCUMENTS

| | | | | |
|---|---|---|---|---|
| 2013/0207543 A1* | 8/2013 | Tatara | .................. | B60Q 1/12 |
| | | | | 315/81 |
| 2013/0258689 A1* | 10/2013 | Takahira | ................ | F21V 14/00 |
| | | | | 362/465 |
| 2014/0003070 A1* | 1/2014 | Nakaya | .................. | B60Q 1/08 |
| | | | | 362/466 |
| 2016/0146419 A1 | 5/2016 | Reinprecht | | |
| 2016/0264042 A1* | 9/2016 | Ito | ..................... | G01M 11/064 |
| 2016/0332560 A1* | 11/2016 | Nakatani | ............ | B60Q 1/1423 |
| 2017/0276980 A1* | 9/2017 | Kauschke | ............ | F21S 41/135 |

FOREIGN PATENT DOCUMENTS

| | | |
|---|---|---|
| JP | 2011-113668 A | 6/2011 |
| JP | 2015-016773 A | 1/2015 |
| JP | 2015-038885 A | 2/2015 |
| WO | 2014/205466 A1 | 12/2014 |

\* cited by examiner

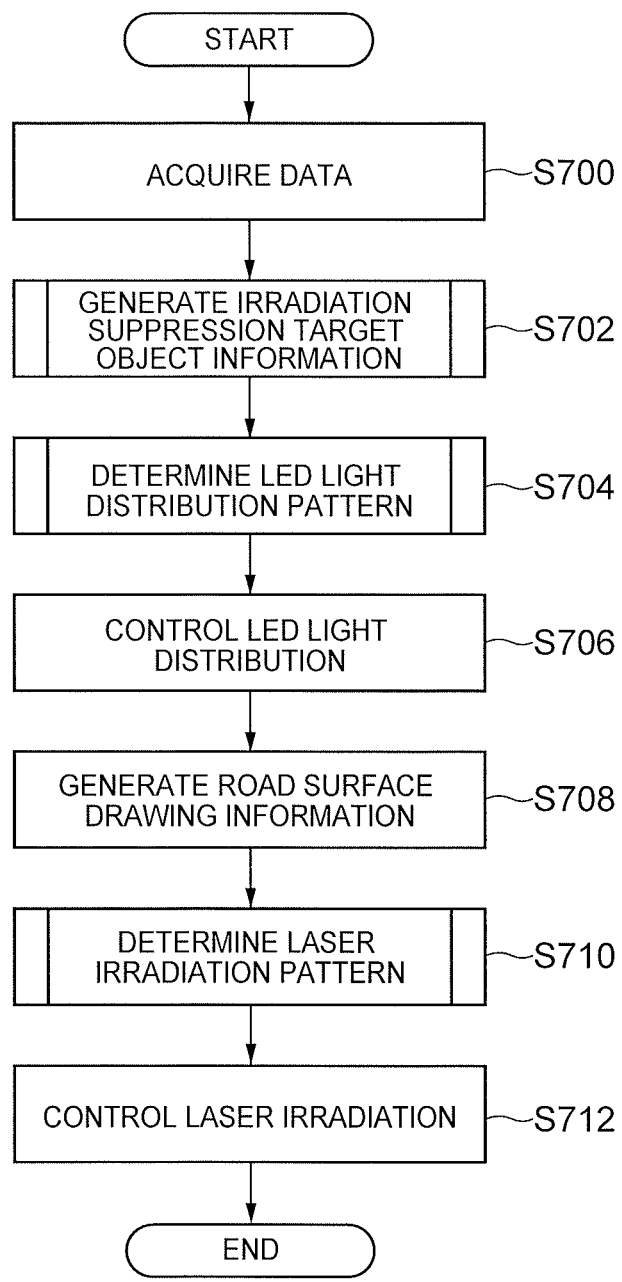

FIG. 10

| M1 | | | | |
|---|---|---|---|---|
| PARTIAL NON-IRRADIATION PATTERN (LED TURNED OFF) | X COORDINATE d1 TO d2 | X COORDINATE d2 TO d3 | X COORDINATE d3 TO d4 | |
| | PATTERN 1 | PATTERN 2 | PATTERN 3 | |

VEHICLE HEADLIGHT DEVICE

INCORPORATION BY REFERENCE

The disclosure of Japanese Patent Application No. 2015-164288 filed on Aug. 21, 2015 including the specification, drawings and abstract is incorporated herein by reference in its entirety.

BACKGROUND OF THE INVENTION

1. Field of the Invention

The invention relates to a vehicle headlight device.

2. Description of Related Art

A vehicle headlight device that includes a laser light source, a movable mirror element, and an actuator and forms various light distribution patterns is known (for example, refer to Japanese Patent Application Publication No. 2015-38885 (JP 2015-38885 A)).

In addition, a vehicle headlight device is known that provides illumination in front of a host vehicle by combining respective LED irradiation-enabled regions of a plurality of light-emitting diodes (LEDs). In this known vehicle headlight device, some of the plurality of LEDs are turned off or dimmed, so that a region corresponding to a vehicle in front of the host vehicle (an example of an irradiation suppression target object) is included in a dark region of a light distribution pattern (a region not irradiated with a high beam light), in a case where the vehicle in front is detected (for example, refer to Japanese Patent Application Publication No. 2015-016773 (JP 2015-016773 A)). This is to reduce a dazzle with respect to the vehicle in front.

Also known is a vehicle headlight device that is capable of forming a dark region by dividing and shielding an irradiation-enabled region in a vertical direction with a movable shade. In this vehicle headlight device, a position and a swivel angle (an orientation of an optical axis in a horizontal plane) of the movable shade is controlled, so that a region corresponding to a vehicle in front is included in the dark region of a light distribution pattern, in a case where the vehicle in front is detected (for example, refer to Japanese Patent Application Publication No. 2009-227088 (JP 2009-227088 A)). This is to reduce a dazzle with respect to the vehicle in front.

In the vehicle headlight devices disclosed in JP 2015-016773 A and JP 2009-227088 A, the dark region of the light distribution pattern cannot be set with a high level of resolution due to constraints associated with a configuration of the LED or a configuration of the movable shade. Accordingly, a problem arises as even a region that may be irradiated with a high beam light originally is included in the dark region. In other words, a problem arises as even the region that may be irradiated with the high beam light originally is affected by the turning off of the LED or shading by the movable shade and becomes dark.

SUMMARY OF THE INVENTION

In the vehicle headlight device disclosed in JP 2015-016773 A, for instance, the respective LED irradiation-enabled regions of the plurality of LEDs are aligned in a line in a horizontal direction. In other words, the vehicle headlight device according to JP 2015-016773 A has no dark-region resolution in a vertical direction. Accordingly, regions on upper and lower sides of the vehicle in front become dark due to the turning off of the LEDs. In addition, in the vehicle headlight device according to JP 2009-227088 A, the movable shade divides the irradiation-enabled region only in the vertical direction. In other words, in the vehicle headlight device according to JP 2009-227088 A, no dark-region resolution exists in the vertical direction. Accordingly, regions above and below the vehicle in front become dark due to the shading by the movable shade.

As described above, the vehicle headlight devices according to the related art that are disclosed in JP 2015-016773 A and JP 2009-227088 A cause a problem by deteriorating a host vehicle driver's visibility, which is attributable to the dark region, although these vehicle headlight devices are capable of reducing the dazzle with respect to the irradiation suppression target object.

The disclosure provides a vehicle headlight device that is capable of reducing a deterioration of a host vehicle driver's visibility attributable to a dark region while reducing a dazzle with respect to an irradiation suppression target object.

An aspect of the disclosure provides a vehicle headlight device including: a sensor acquiring information on an object in front of a host vehicle; a first lighting irradiating a space in front of the host vehicle with light; a second lighting including a laser light source emitting laser light, a movable mirror element reflecting the laser light in a front of the host vehicle, and an actuator driving the movable mirror element; and at least one processor. The at least one processor is configured to: control a light distribution pattern formed by the light by the first lighting based on the information obtained by the sensor such that an irradiation suppressed site where the irradiation with the light by the first lighting is reduced is included in a dark region where the irradiation with the light by the first lighting is reduced, the irradiation suppressed site including at least a part of an irradiation suppression target object, and the irradiation suppression target object being detected by the sensor; set a laser light distribution pattern in which irradiation with the laser light is performed in a region not including the irradiation suppressed site and included in the dark region; and control the actuator such that the laser light is reflected in the laser light distribution pattern.

According to the above aspect, the dazzle with respect to the irradiation suppression target object can be reduced and the deterioration of the host vehicle driver's visibility attributable to the dark region can be reduced at the same time in this manner.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a flowchart illustrating an example of a light distribution control processing of the control device according to the first embodiment;

FIG. 10 is a diagram illustrating an example of a map data M1 that is used for a partial non-irradiation pattern determination;

DETAILED DESCRIPTION OF EMBODIMENTS

Hereinafter, embodiments of the invention will be described with reference to accompanying drawings.

First Embodiment

Figure 1:
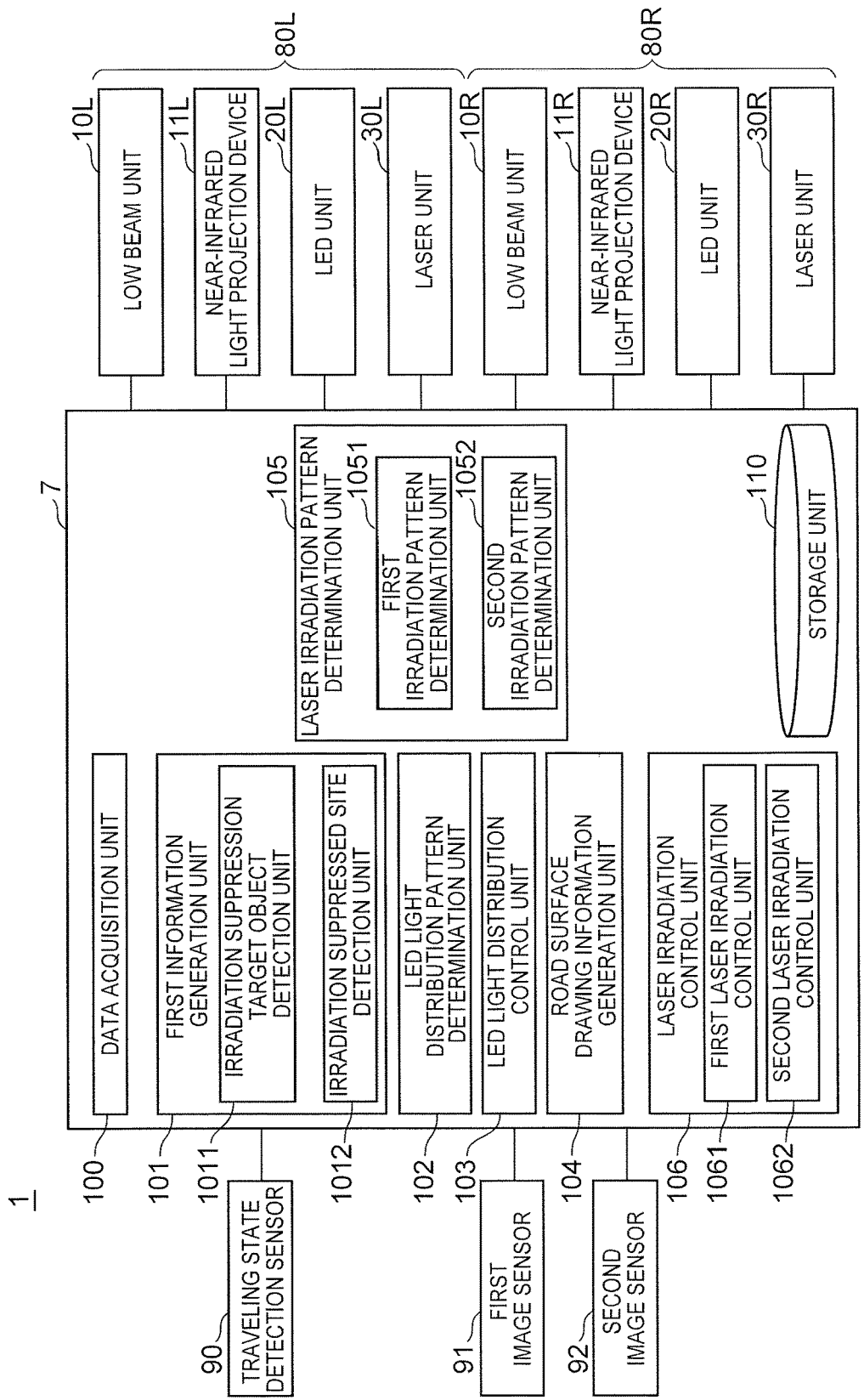
FIG. 1 is a diagram illustrating a configuration diagram of a vehicle headlight device according to a first embodiment of the invention.
Figure 2:
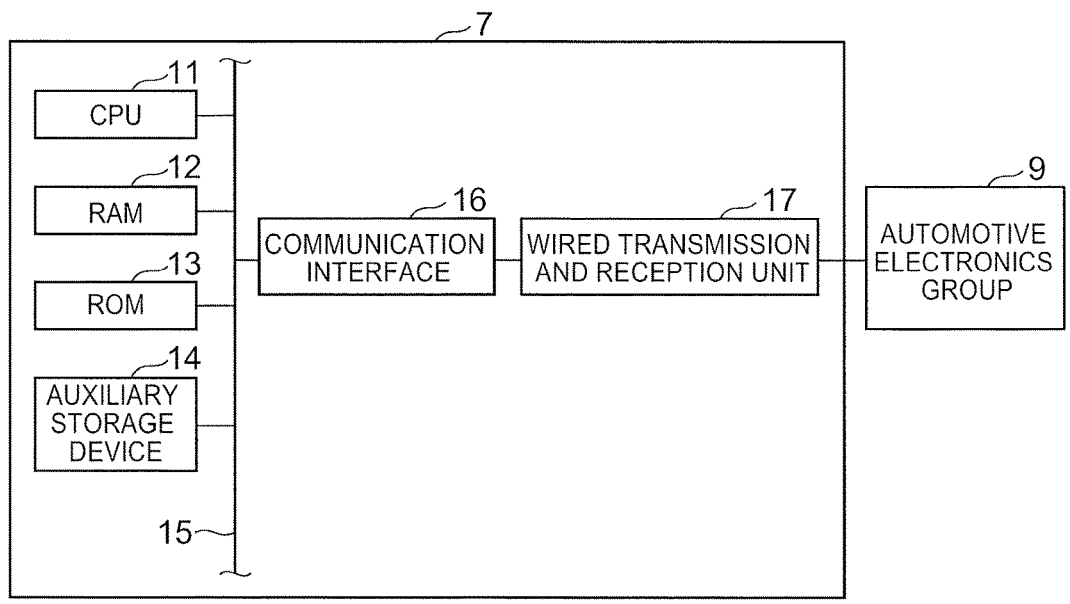
FIG. 2 is a diagram illustrating an example of a hardware configuration of a control device.

Hereinafter, a first embodiment of the invention will be described. FIG. 1 is a diagram illustrating a configuration diagram of a vehicle headlight device 1 according to the first embodiment of the invention. FIG. 2 is a diagram illustrating an example of a hardware configuration of a control device. An automotive electronics group 9 is schematically illustrated in FIG. 2, associated with the hardware configuration of an information recording ECU 7.

The vehicle headlight device 1 is mounted on a vehicle. The vehicle on which the vehicle headlight device 1 is mounted will be referred to as a "host vehicle".

The vehicle headlight device 1 includes a control device 7, right and left headlights 80R, 80L, a traveling state detection sensor 90, a first image sensor 91, and a second image sensor 92.

As illustrated in FIG. 2, the control device 7 includes a central processing unit (CPU) 11, a random access memory (RAM) 12, a read-only memory (ROM) 13, an auxiliary storage device 14, and a communication interface 16 that are connected by a bus 15 and a wired transmission and reception unit 17 that is connected to the communication interface 16. The auxiliary storage device 14 is, for example, an electrically erasable programmable read-only memory (EEPROM) or a hard disk drive (HDD). The wired transmission and reception unit 17 includes a transmission and reception unit that is capable of communication using a vehicle network such as a controller area network (CAN) and a local interconnect network (LIN). A wireless transmission and reception unit such as a near-field communication (NFC) unit, a Bluetooth (registered trademark) communication unit, a wireless fidelity (Wi-Fi) transmission and reception unit, and an infrared transmission and reception unit may also be disposed in addition to the wired transmission and reception unit 17.

The headlights 80R, 80L, the traveling state detection sensor 90, the first image sensor 91, and the second image sensor 92 are connected to the control device 7. The headlights 80R, 80L, the traveling state detection sensor 90, the first image sensor 91, and the second image sensor 92 form the automotive electronics group 9 that is illustrated in FIG. 2.

The headlight 80L is disposed on a left side of a front portion of the host vehicle. The headlight 80L provides illumination in front of the host vehicle. The headlight 80L includes a low beam (passing headlight) unit 10L, a near-infrared light projection device 11L, a LED unit 20L, and a laser unit 30L.

The headlight 80R is disposed on a right side of the front portion of the host vehicle. The headlight 80R provides illumination in front of the host vehicle. The headlight 80R includes a low beam unit 10R, a near-infrared light projection device 11R, a LED unit 20R, and a laser unit 30R.

The traveling state detection sensor 90 includes a vehicle speed sensor and a steering sensor. The vehicle speed sensor detects a speed of the vehicle. The steering sensor detects a steering angle. Results of the detection by the traveling state detection sensor 90 are used for a control for causing an irradiation direction (optical axes) of the headlights 80R, 80L to correspond to a direction in which the host vehicle turns (adaptive front-lighting system (AFS)).

Each of the first image sensor 91 and the second image sensor 92 acquires information on an object in front of the host vehicle. Specifically, each of the first image sensor 91 and the second image sensor 92 is a camera that acquires an image of a space in front of the host vehicle. Imaging ranges (view angles) of the first image sensor 91 and the second image sensor 92 enclose at least irradiation-enabled regions (described later) of the headlights 80R, 80L. In the following description, mounting positions and the imaging ranges (the view angles and optical axes) of the first image sensor 91 and the second image sensor 92 will be regarded as being substantially the same as each other and will be regarded as being identical to each other. In addition, in the following description, a landscape in front of the host vehicle that is captured by the first image sensor 91 will be regarded as one which can be regarded as being the same as a landscape in front of the host vehicle that a general driver captures with his or her eye.

The first image sensor 91 is a color camera that is capable of identifying a difference in color of lamps (headlamps and tail lamps) of a vehicle in front. The vehicle in front is a concept that includes a preceding car and an oncoming car. In this first embodiment, an infrared cut filter that cuts an infrared wavelength of at least 700 nm is disposed in the first image sensor 91 so that color reproducibility is ensured. For example, the first image sensor 91 is attached to an inner mirror in a passenger compartment, directed toward a front of the host vehicle.

The second image sensor 92 has infrared sensitivity. The second image sensor 92 is provided with a visible light cut filter and acquires a near-infrared image. For example, the second image sensor 92 is attached to the inner mirror in the passenger compartment, directed toward the front of the host vehicle.

As illustrated in FIG. 1, the control device 7 includes a data acquisition unit 100, a first information generation unit 101, a LED light distribution pattern determination unit 102, a LED light distribution control unit 103, a road surface drawing information generation unit 104, a laser irradiation pattern determination unit 105, a laser irradiation control unit 106, and a storage unit 110. Each of the data acquisition unit 100, the first information generation unit 101, the LED light distribution pattern determination unit 102, the LED light distribution control unit 103, the road surface drawing information generation unit 104, the laser irradiation pattern determination unit 105, and the laser irradiation control unit 106 can be realized by the CPU 11 that is illustrated in FIG. 2 executing one or more programs which are stored in the ROM 13 that is illustrated in FIG. 2. The storage unit 110 can be realized by the ROM 13.

The data acquisition unit 100 acquires sensor information from the traveling state detection sensor 90, the first image sensor 91, and the second image sensor 92.

The first information generation unit 101 generates information relating to an irradiation suppression target object within a range in front of the host vehicle (hereinafter, referred to as "irradiation suppression target object information") based on the sensor information (images) from the first image sensor 91 and the second image sensor 92 acquired by the data acquisition unit 100. In this first embodiment, the irradiation suppression target objects are the vehicle in front and a pedestrian. The irradiation suppression target object information includes information relating to whether the irradiation suppression target object is present or absent and information relating to a position of the irradiation suppression target object. As described later, a processing for the generation of the irradiation suppression target object information includes a processing for setting an irradiation suppressed region (described later).

The first information generation unit 101 includes an irradiation suppression target object detection unit 1011 and an irradiation suppressed site detection unit 1012.

The irradiation suppression target object detection unit 1011 identifies the irradiation suppression target object in the irradiation-enabled regions of the LED units 20R, 20L (described later) based on the information (the images) from the first image sensor 91 and the second image sensor 92. A specific example of a method for identifying the irradiation suppression target object will be described later.

The irradiation suppressed site detection unit 1012 identifies a predetermined site (an irradiation suppressed site), which is a part of the irradiation suppression target object identified by the irradiation suppression target object detection unit 1011, based on the information from the first image sensor 91 and the second image sensor 92. When the irradiation suppression target object is the oncoming car, the predetermined site is, for example, an entire front windshield glass or a part of the front windshield glass (such as the driver's seat-side half in a right-to-left direction). When the irradiation suppression target object is the preceding car, the predetermined site is, for example, an entire rear glass or a central portion of the rear glass. When the irradiation suppression target object is the pedestrian, the predetermined site is, for example, the pedestrian's face. A specific example of a method for identifying the predetermined site will be described later.

The LED light distribution pattern determination unit 102 determines respective LED light distribution patterns of the LED units 20R, 20L based on the irradiation suppression target object information from the first information generation unit 101 (a result of the identification by the irradiation suppression target object detection unit 1011). The LED light distribution patterns refer to a pattern that is formed by irradiation light of the LED units 20R, 20L projected on an imaginary vertical screen in front of the LED units 20R, 20L. The LED light distribution pattern selectively includes a normal light distribution pattern and a partial non-irradiation pattern in which a part of an irradiation region of the normal light distribution pattern is a dark region (described later). A specific example of a method for determining the LED light distribution pattern will be described later.

The LED light distribution control unit 103 controls the respective light distribution patterns of the LED units 20R, 20L so that the respective light distribution patterns of the LED units 20R, 20L correspond to the LED light distribution pattern determined by the LED light distribution pattern determination unit 102. In other words, the LED light distribution control unit 103 controls the LED units 20R, 20L so that the LED light distribution pattern determined by the LED light distribution pattern determination unit 102 is realized. A specific example of a method for this control will be described later.

The road surface drawing information generation unit 104 generates information for a laser light-based road surface drawing (hereinafter, referred to as "road surface drawing information"). The laser light-based road surface drawing can be realized by a road surface of a road in front of the host vehicle being irradiated in a predetermined pattern (by a predetermined pattern being drawn with light on a road surface). The road surface drawing information generation unit 104 generates information to be transmitted to a host vehicle passenger as the road surface drawing information with the laser light-based road surface drawing. Examples of the road surface drawing information include guide information of a navigation device (not illustrated).

The laser irradiation pattern determination unit 105 determines respective laser light irradiation patterns of the laser units 30R, 30L. The laser irradiation pattern determination unit 105 includes a first irradiation pattern determination unit 1051 and a second irradiation pattern determination unit 1052.

The first irradiation pattern determination unit 1051 determines the respective laser light irradiation patterns of the laser units 30R, 30L based on the irradiation suppression target object information from the first information generation unit 101 and the LED light distribution pattern determined by the LED light distribution pattern determination unit 102. The laser light irradiation pattern refers to a pattern (a scanning pattern) in which a phosphor 34 (described later) is irradiated with laser light. The laser light irradiation pattern and a pattern that is formed by irradiation light of the laser units 30R, 30L projected on an imaginary vertical screen in front of the laser units 30R, 30L (that is, light distribution patterns of the laser units 30R, 30L) have a one-to-one correspondence relationship. Accordingly, in this embodiment, determining the laser light irradiation patterns of the laser units 30R, 30L has substantially the same meaning as determining the light distribution patterns of the laser units 30R, 30L. In the following description, the laser light irradiation pattern that is determined by the first irradiation pattern determination unit 1051 will be referred to as a "first laser irradiation pattern". The light distribution pattern (a pattern on the vertical screen) that is realized by irradiation in the first laser irradiation pattern is an example of a "laser light distribution pattern". A specific example of a method for determining the first laser irradiation pattern will be described later.

The second irradiation pattern determination unit 1052 determines the respective laser light irradiation patterns of the laser units 30R, 30L based on the road surface drawing information from the road surface drawing information generation unit 104. In the following description, the laser light irradiation pattern that is determined by the second irradiation pattern determination unit 1052 will be referred to as a "second laser irradiation pattern". In a case where the road surface drawing information is a right or left turn mark as the guide information of the navigation device as described above, for example, the second irradiation pattern determination unit 1052 determines the second laser irradiation pattern in which the right or left turn mark is visible on the road surface. In this manner, information relating to the road surface drawing information can be effectively transmitted to the host vehicle passenger. A correspondence relationship between the road surface drawing information and the second laser irradiation pattern is stored in advance in the storage unit 110 as map data.

The laser irradiation control unit 106 controls the laser units 30R, 30L based on the irradiation pattern determined by the laser irradiation pattern determination unit 105. The laser irradiation control unit 106 includes a first laser irradiation control unit 1061 and a second laser irradiation control unit 1062. In a case where the first laser irradiation pattern has been determined by the first irradiation pattern determination unit 1051, the first laser irradiation control unit 1061 controls the laser units 30R, 30L based on that first laser irradiation pattern. In a case where the second laser irradiation pattern has been determined by the second irradiation pattern determination unit 1052, the second laser irradiation control unit 1062 controls the laser units 30R, 30L based on that second laser irradiation pattern.

The map data such as map data M1 (described later) and the like are stored in the storage unit 110. The map data M1 will be described later.

Hereinafter, configurations of the headlights 80R, 80L will be described with reference to FIGS. 3 to 6B.

Figure 3:
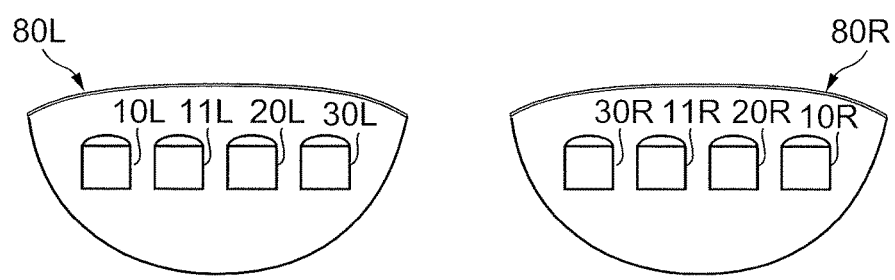
FIG. 3 is a schematic configuration diagram of right and left headlights.

FIG. 3 is a top view schematically illustrating the configurations of the headlights 80R, 80L.

As schematically illustrated in FIG. 3, the low beam unit 10L, the near-infrared light projection device 11L, the LED unit 20L, and the laser unit 30L of the headlight 80L on the left side are aligned in a lateral direction. Likewise, the low beam unit 10R, the near-infrared light projection device 11R, the LED unit 20R, and the laser unit 30R of the headlight 80R on the right side are aligned in the lateral direction as schematically illustrated in FIG. 3. The order of the alignment and the direction of the alignment may follow aspects other than those illustrated in FIG. 3.

Each of the near-infrared light projection devices 11R, 11L releases near-infrared light toward the space in front of the host vehicle. Each of the near-infrared light projection devices 11R, 11L can be switched ON/OFF. The near-infrared light is emitted when the near-infrared light projection device 11R or 11L is turned ON. Each of the near-infrared light projection devices 11R, 11L projects the near-infrared light in a horizontal direction (above the low beam units 10R, 10L) toward the space in front of the host vehicle.

Each of the low beam units 10R, 10L is formed by the use of a halogen lamp, a high-intensity discharge (HID) lamp, a LED lamp, or the like.

Each of the LED units 20R, 20L is formed by the use of an array in which a plurality of LEDs are aligned in a line in the lateral direction. The LED units 20R, 20L emit high beam light in the horizontal direction (along an optical axis higher than the low beam units 10R, 10L) toward the space in front of the host vehicle.

Figure 4A:
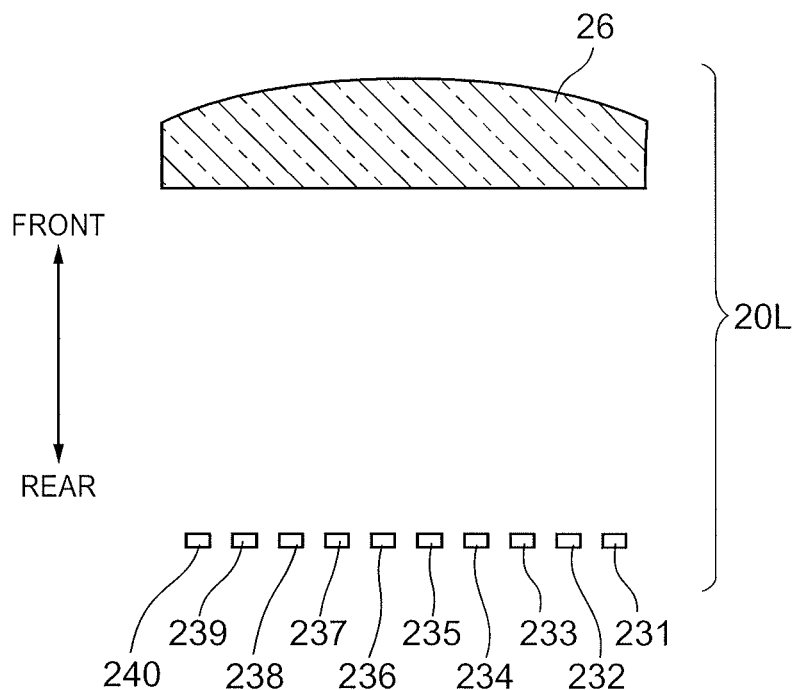
FIG. 4A is a top view schematically illustrating a configuration of a LED unit.

FIG. 4A is a top view schematically illustrating a configuration of the LED unit 20L. The configuration of the LED unit 20L described herein is substantially identical to a configuration of the LED unit 20R.

As illustrated in FIG. 4A, the LED unit 20L includes, for example, 10 LEDs 231 to 240 and a lens 26. The 10 LEDs 231 to 240 are placed in a line in the lateral direction. The 10 LEDs 231 to 240 are placed in a line on, for example, a horizontal plane. The 10 LEDs 231 to 240 may be aligned on a line at a slight angle to the horizontal plane, too.

The lens 26 projects light from the LEDs 231 to 240 toward the space in front of the host vehicle.

States regarding turning on of the LEDs 231 to 240 of the LED unit 20L (ON/OFF and a light emission intensity at a time when the LEDs 231 to 240 are turned on) are controlled by the LED light distribution control unit 103. The states regarding the turning on of the LEDs 231 to 240 can be controlled based on, for example, a pulse width modulation (PWM) control. The LED unit 20L irradiates the space in front of the host vehicle with the light from the LEDs 231 to 240 under the control by the LED light distribution control unit 103.

Figure 4B:
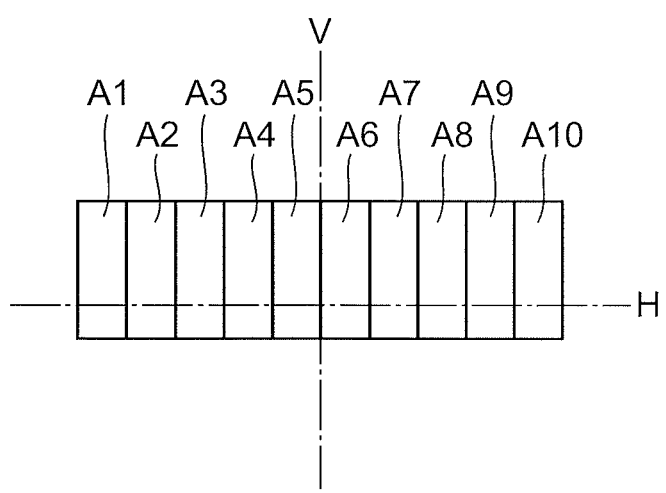
FIG. 4B is a diagram schematically illustrating an example of a LED irradiation-enabled region of the LED unit.

FIG. 4B is a diagram schematically illustrating an example of a LED irradiation-enabled region of the LED unit 20L. LED irradiation-enabled regions A1 to A10 of the LED unit 20L in FIG. 4B are schematic LED irradiation-enabled regions at a time when the front of the host vehicle is seen from the driver's point of view. A line V represents a vertical line corresponding to a central position of the entire LED irradiation-enabled region of the LED irradiation-enabled regions A1 to A10 of the LED unit 20L, and H represents a horizontal line. In FIG. 4B, the LED irradiation-enabled regions are shown as two-dimensional regions that are formed on an imaginary vertical screen at a predetermined position in front of the host vehicle.

As illustrated in FIG. 4B, The LED irradiation-enabled region of the LED unit 20L consists of a set of the plurality of LED irradiation-enabled regions A1 to A10 that are divided in a vertical direction. In view of light distribution characteristics, the vertical division includes a concept of vertical division as a whole and does not necessarily have to be limited to accurate division along a straight line. The LED irradiation-enabled regions A1 to A10 of the LED unit 20L in FIG. 4B correspond to irradiation regions at a time when the 10 LEDs 231 to 240 are turned on, respectively. Specifically, the LED irradiation-enabled region A1 of the LED unit 20L corresponds to the irradiation region at a time when the LED 231 is turned on, the LED irradiation-enabled region A2 of the LED unit 20L corresponds to the irradiation region at a time when the LED 232 is turned on, and so on. Basically, all the LED irradiation-enabled regions A1 to A10 of the LED unit 20L correspond to the irradiation region of a general high beam (headlight for traveling). As illustrated in FIG. 4A, all the LED irradiation-enabled regions A1 to A10 of the LED unit 20L include regions above and below the horizontal line. LED irradiation-enabled regions (not illustrated) of the LED unit 20R are basically regions overlapping the respective LED irradiation-enabled regions A1 to A10 of the LED unit 20L. Accordingly, in the following description, the respective LED irradiation-enabled regions of the LED unit 20R and the respective LED irradiation-enabled regions A1 to A10 of the LED unit 20L will not be distinguished from each other.

Figure 5A:
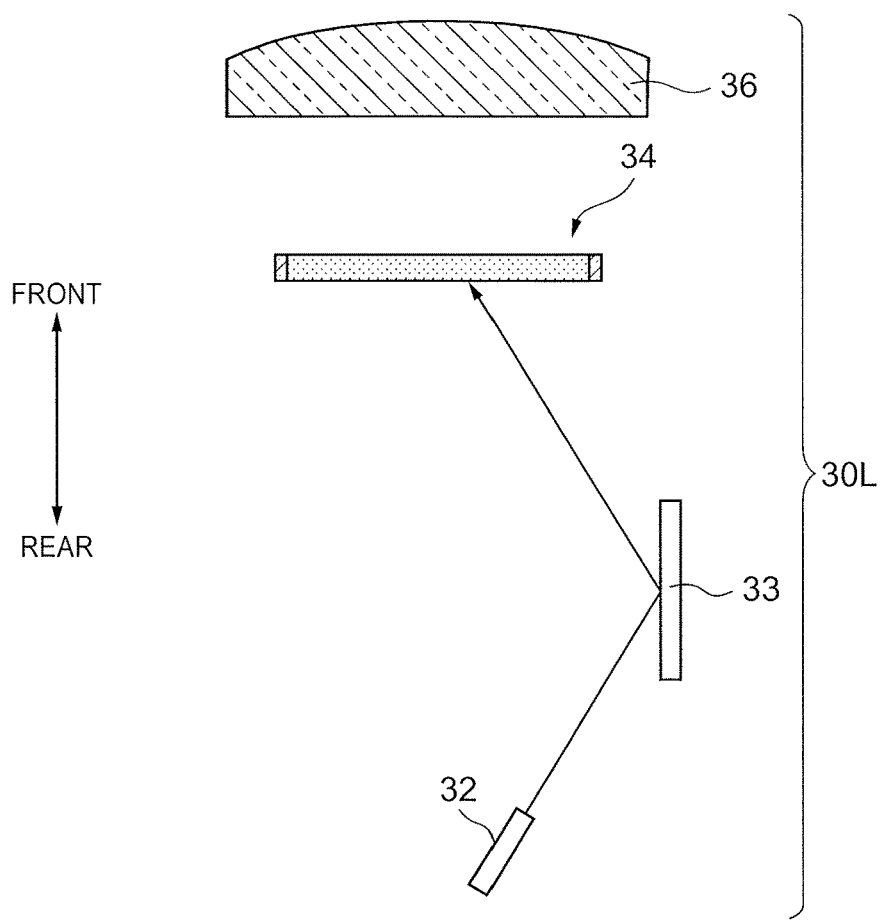
FIG. 5A is a top view schematically illustrating a configuration of a laser unit.
Figure 5B:
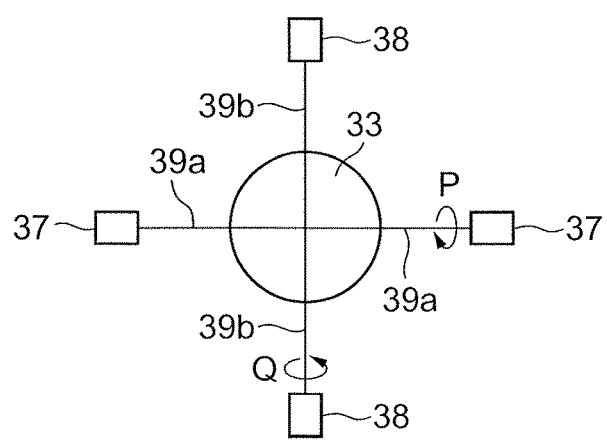
FIG. 5B is a conceptual diagram schematically illustrating a MEMS mirror driving principle.
Figure 5C:
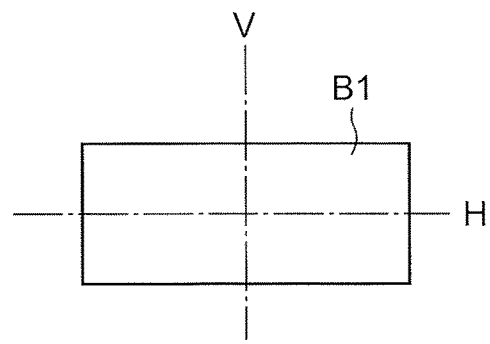
FIG. 5C is a diagram schematically illustrating an example of a laser irradiation-enabled region of the laser unit.
Figure 6A:
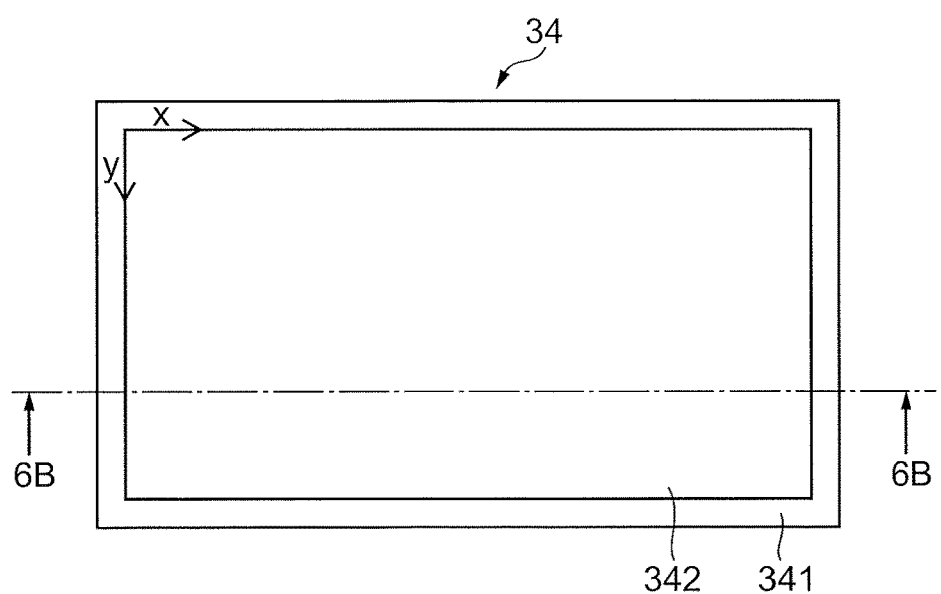
FIG. 6A is a front view of a phosphor of the laser unit.
Figure 6B:
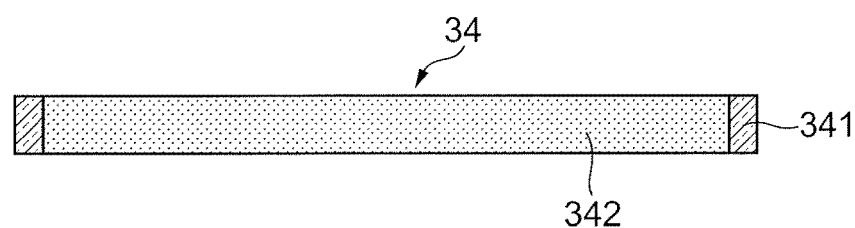
FIG. 6B is a sectional view of the phosphor taken along line 6B-6B in FIG. 6A.

FIG. 5A is a top view schematically illustrating a configuration of the laser unit 30L, FIG. 5B is a conceptual diagram schematically illustrating a driving principle regarding a MEMS mirror 33, and FIG. 5C is a diagram schematically illustrating an example of a laser irradiation-enabled region of the laser unit 30L at the time when the front of the host vehicle is seen from the driver's point of view. FIG. 6A is a front view of the phosphor 34 of the laser unit 30L, and FIG. 6B is a sectional view of the phosphor 34 taken along line 6B-6B in FIG. 6A. The configuration of the laser unit 30L described herein is substantially identical to a configuration of the laser unit 30R. A direction in which laser light from a laser light source 32 is reflected is schematically illustrated by an arrow in FIG. 5A.

As illustrated in FIGS. 5A and 5B, the laser unit 30L includes the laser light source 32, the microelectromechanical systems (MEMS) mirror 33 (an example of a movable mirror element), the phosphor 34, a lens 36, and actuators 37, 38 (not illustrated in FIG. 5A).

The laser light source 32, which is a semiconductor laser or the like, generates the laser light (such as blue light).

The MEMS mirror 33 is rotatable (tiltable) about two axes. The MEMS mirror 33 is driven to rotate about the two axes by the actuators 37, 38 as schematically illustrated by directions of rotation P, Q in FIG. 5B. The two axes are included in a reflective surface of the MEMS mirror 33 and are orthogonal to each other. The actuators 37, 38 are, for example, piezoelectric lead zirconate titanate (PZT) films.

The actuators 37, 38 expand and contract by a voltage being applied, and the reflective surface of the MEMS mirror 33 rotates as the expansion and contraction are transmitted to axes of rotation 39a, 39b. The MEMS mirror 33 causes the laser light from the laser light source 32 to be reflected toward any point on the phosphor 34. A relationship between an angle of the MEMS mirror 33 (each angle about the two axes) and a position on the phosphor 34 that the laser light reaches after the reflection by the MEMS mirror 33 is geometrically determined.

As illustrated in FIGS. 6A and 6B, the phosphor 34 has a configuration in which a phosphor material 342 is held by a frame 341. As illustrated in FIG. 6A, the phosphor 34 has the shape of a plate and emits light at the position on the phosphor 34 that the laser light reaches. Specifically, the phosphor material 342 of the phosphor 34 is excited and emits yellow light by receiving the blue light emitted from the laser light source 32. The yellow light has a complementary relationship with the blue light, and thus white light is emitted from the phosphor 34 with the blue light and the yellow light mixed with each other.

The lens 36 projects the light from the phosphor 34 to the space in front of the host vehicle.

A state regarding turning on of the laser light source 32 of the laser unit 30L (ON/OFF) and each of the angles of the MEMS mirror 33 about the two axes are controlled by the laser irradiation control unit 106. Under the control by the laser irradiation control unit 106, the laser unit 30L diffuses the laser light (the laser light from the laser light source 32 which is a point light source) in front of the host vehicle and irradiates the space in front of the host vehicle with the laser light by causing the laser light from the laser light source 32 to be reflected toward the space in front of the host vehicle while changing each of the angles of the MEMS mirror 33 about the two axes.

A laser irradiation-enabled region B1 of the laser unit 30L that is illustrated in FIG. 5C corresponds to the irradiation region at a time when the entire phosphor 34 emits the light. The laser irradiation-enabled region B1 of the laser unit 30L includes the entire LED irradiation-enabled region of all the LED irradiation-enabled regions A1 to A10 of the LED unit 20L. In addition, a laser irradiation-enabled region (not illustrated) of the laser unit 30R is substantially the same as the laser irradiation-enabled region B1 of the laser unit 30L. Accordingly, in the following description, the laser irradiation-enabled region of the laser unit 30R and the laser irradiation-enabled region of the laser unit 30L will not be distinguished from each other.

When only a part of the phosphor 34 emits the light, a corresponding partial region in the laser irradiation-enabled region B1 is the irradiation region of the laser unit 30L. Accordingly, a desired region in the laser irradiation-enabled region B1 can become the irradiation region of the laser unit 30L by the MEMS mirror 33 and the laser light source 32 being controlled and the pattern (the scanning pattern) in which the phosphor 34 is irradiated with the laser light being changed.

Hereinafter, a processing that is executed by the control device 7 will be described with reference to FIGS. 7 to 13. In the following description, a light distribution control processing with respect to the headlight 80L will be described. The same is applied to a light distribution control processing with respect to the headlight 80R.

FIG. 7 is a flowchart illustrating an example of the light distribution control processing of the control device 7. The light distribution control processing that is illustrated in FIG. 7 is repeatedly executed at predetermined time intervals in a case where, for example, the headlight 80L is turned ON and a light distribution control switch (not illustrated) is turned ON. When the light distribution control switch is turned ON, the near-infrared light projection device 11L is turned ON.

In Step S700, the data acquisition unit 100 acquires the sensor information from the traveling state detection sensor 90, the first image sensor 91, and the second image sensor 92.

In Step S702, the first information generation unit 101 performs the irradiation suppression target object information generation processing based on the sensor information obtained in Step S700. An example of the irradiation suppression target object information generation processing will be described later.

In Step S704, the LED light distribution pattern determination unit 102 performs a LED light distribution pattern determination processing based on the irradiation suppression target object information obtained in Step S702. As described above, the LED light distribution pattern selectively includes the normal light distribution pattern and the partial non-irradiation pattern in which a part of the irradiation region of the normal light distribution pattern is the dark region. The normal light distribution pattern corresponds to a pattern at a time when all the LEDs 231 to 240 of the LED unit 20L are turned on. The partial non-irradiation pattern corresponds to a pattern at a time when one or more of all the LEDs 231 to 240 of the LED unit 20L are not turned on. An example of the LED light distribution pattern determination processing will be described later.

In Step S706, the LED light distribution control unit 103 controls the states regarding the turning on of the LED unit 20L based on the LED light distribution pattern obtained in Step S704. For example, the LED light distribution control unit 103 turns on all the LEDs 231 to 240 of the LED unit 20L when the LED light distribution pattern obtained in Step S704 is the normal light distribution pattern. At this time, the LED light distribution control unit 103 may turn on all the LEDs 231 to 240 of the LED unit 20L at the same brightness or may allow the brightness of the entire irradiation region of the LED unit 20L to become uniform by independently adjusting the brightness of each of the LEDs 231 to 240. When the LED light distribution pattern obtained in Step S704 is the partial non-irradiation pattern, the LED light distribution control unit 103 turns off the corresponding LEDs among the respective LEDs 231 to 240 of the LED unit 20L. When the LED light distribution pattern obtained in Step S704 is the partial non-irradiation pattern in which the LED irradiation-enabled region A6 illustrated in FIG. 4B is the dark region, for example, the LED light distribution control unit 103 turns off the LED 236 that corresponds to the LED irradiation-enabled region A6 among the LEDs 231 to 240.

In Step S708, the road surface drawing information generation unit 104 generates the road surface drawing information. The road surface drawing information is as described above. The road surface drawing information is generated only when a road surface drawing information generation condition is satisfied. The road surface drawing information generation condition is satisfied when, for example, there is a request from the navigation device.

In Step S710, the laser irradiation pattern determination unit 105 performs a laser light irradiation pattern determination processing. As described above, the laser light irradiation pattern includes the first laser irradiation pattern and the second laser irradiation pattern. The first irradiation pattern determination unit 1051 of the laser irradiation pattern determination unit 105 determines the first laser irradiation pattern based on the irradiation suppression target object information obtained in Step S702 and the LED light distribution pattern obtained in Step S704. The second irradiation pattern determination unit 1052 of the laser irradiation pattern determination unit 105 determines the second laser irradiation pattern based on the road surface drawing information obtained in Step S708. An example of the laser light irradiation pattern determination processing will be described later.

In Step S712, the laser irradiation control unit 106 controls the laser unit 30L based on the laser light irradiation pattern obtained in Step S710. The laser irradiation control unit 106 controls the state regarding the turning on of the laser light source 32 and each of the angles of the MEMS mirror 33 about the two axes based on the laser light irradiation pattern obtained in Step S710. For example, the first laser irradiation control unit 1061 turns on or turns off the laser light source 32 in accordance with each of the angles of the MEMS mirror 33 about the two axes while controlling each of the angles of the MEMS mirror 33 about the two axes such that scanning using the laser light from the laser light source 32 is performed on the phosphor 34 by a raster scan method. Alternatively, the first laser irradiation control unit 1061 controls each of the angles of the MEMS mirror 33 about the two axes, while maintaining a state where the laser light source 32 is turned on, such that the scanning using the laser light from the laser light source 32 is performed on the phosphor 34 by a vector scan method.

Figure 8A:
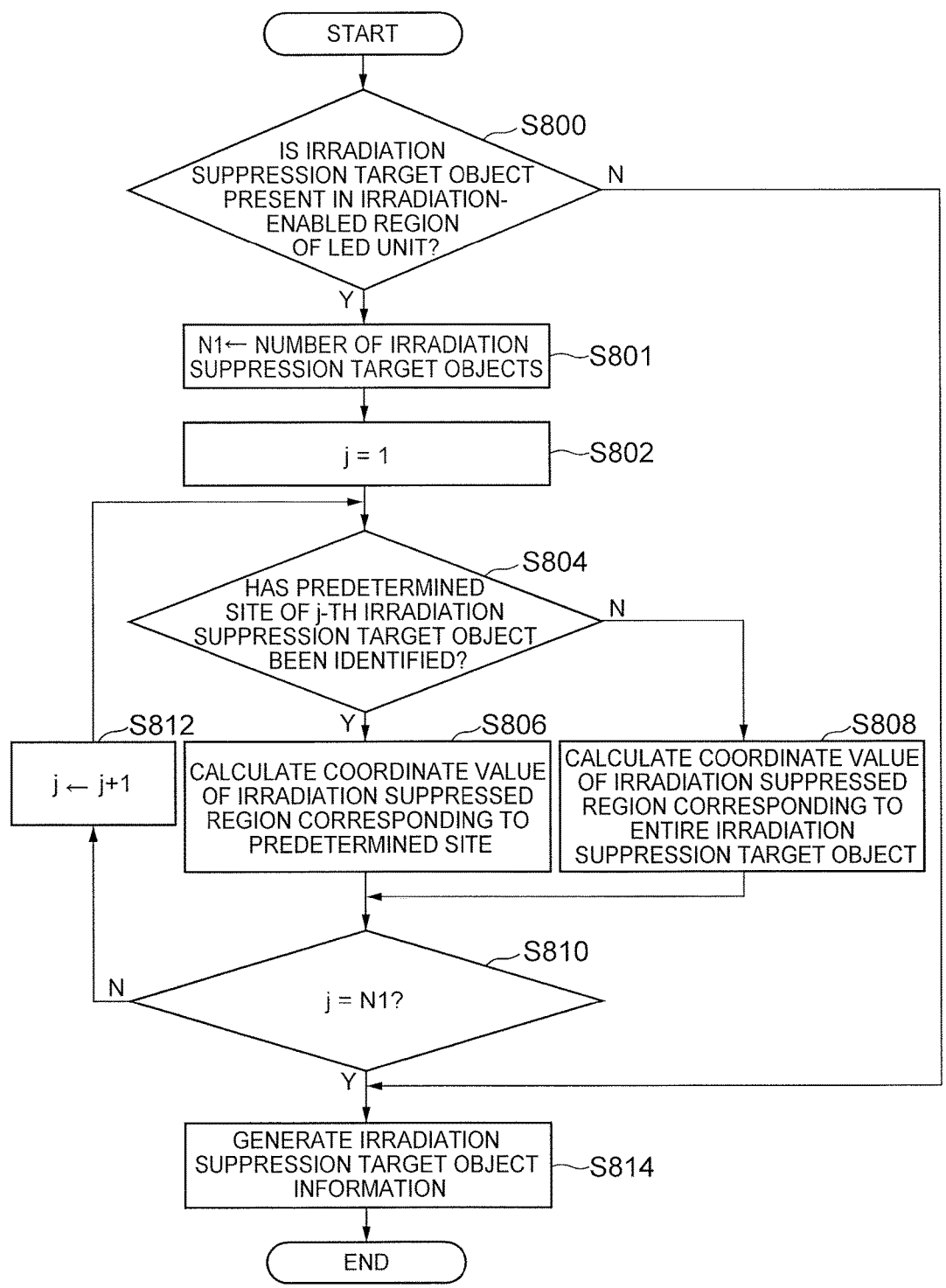
FIG. 8A is a flowchart illustrating an example of a processing for generating an irradiation suppression target object information.
Figure 8B:
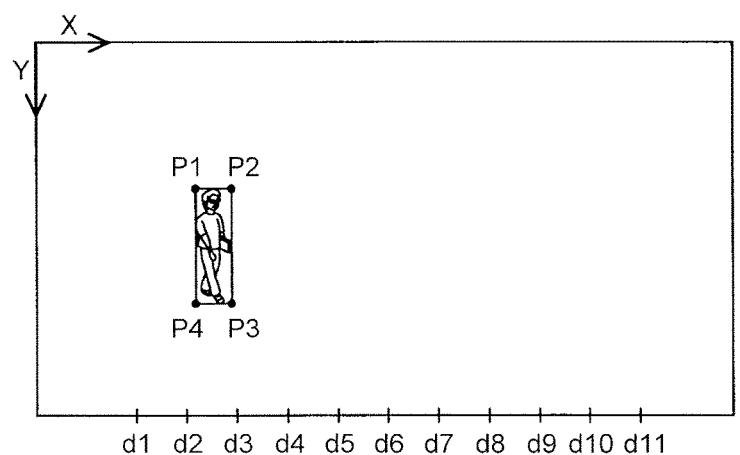
FIG. 8B is an explanatory diagram of the irradiation suppression target object information.

FIG. 8A is a flowchart illustrating an example of the irradiation suppression target object information generation processing (Step S702). FIG. 8B is an explanatory diagram of the irradiation suppression target object information.

In Step S800, the irradiation suppression target object detection unit 1011 of the first information generation unit 101 determines whether or not the irradiation suppression target object is present in the irradiation-enabled region of the LED unit 20L (the entire LED irradiation-enabled region of the LED irradiation-enabled regions A1 to A10) based on the sensor information obtained in Step S700. In this first embodiment, the irradiation suppression target objects are the vehicle in front (the preceding car and the oncoming car) and the pedestrian. The vehicle in front can be identified in, for example, the following manner. The irradiation suppression target object detection unit 1011 searches for a pixel group (a unit of reddish high-brightness pixels) corresponding to the tail lamps of the preceding car in the image acquired by the first image sensor 91. A search region in the image is a pixel region corresponding to the irradiation-enabled region of the LED unit 20L. At this time, the irradiation suppression target object detection unit 1011 determines whether or not the pixel group corresponding to a pair of the right and left tail lamps of the preceding car is present. This determination is effective when the preceding car is a four-wheel car that is provided with the pair of right and left tail lamps. In a case where the pixel group corresponding to the pair of right and left tail lamps of the preceding car is present, the irradiation suppression target object detection unit 1011 identifies a pixel group relating to the preceding car based on that pixel group. In addition, the irradiation suppression target object detection unit 1011 searches for a pixel group (a unit of whitish high-brightness pixels) corresponding to the headlamps of the oncoming car. Likewise, a search region in the image is a pixel region corresponding to the irradiation-enabled region of the LED unit 20L. At this time, the irradiation suppression target object detection unit 1011 determines whether or not the pixel group corresponding to a pair of the right and left headlamps of the oncoming car is present. This determination is effective when the oncoming car is a four-wheel car that is provided with the pair of right and left headlamps. In a case where the pixel group corresponding to the pair of right and left headlamps of the oncoming car is present, the irradiation suppression target object detection unit 1011 identifies a pixel group relating to the oncoming car based on that pixel group. Whether the pedestrian is present or absent can be determined in, for example, the following manner. The irradiation suppression target object detection unit 1011 searches for a pixel group corresponding to the pedestrian based on the near-infrared image acquired by the second image sensor 92. Likewise, a search region in the near-infrared image is a pixel region corresponding to the irradiation-enabled region of the LED unit 20L. In a case where the pixel group corresponding to the pedestrian is present, the irradiation suppression target object detection unit 1011 identifies that pixel group as a pixel group relating to the pedestrian. The processing proceeds to Step S801 in the case of a "YES" determination result, and the processing proceeds to Step S814 in the case of a "NO" determination result. In a case where a plurality of the irradiation suppression target objects are present in the irradiation-enabled region of the LED unit 20L, the plurality of irradiation suppression target objects can be identified by the irradiation suppression target object detection unit 1011.

In Step S801, the first information generation unit 101 sets a value N1 as the number of the irradiation suppression target objects identified in Step S800.

In Step S802, the first information generation unit 101 sets a value j to "1".

In Step S804, the irradiation suppressed site detection unit 1012 of the first information generation unit 101 selects the j-th irradiation suppression target object and determines whether or not the predetermined site of the j-th irradiation suppression target object can be identified. In a case where the number of the irradiation suppression target objects is two or more, for example, the irradiation suppressed site detection unit 1012 sorts the irradiation suppression target objects in any order and selects the j-th irradiation suppression target object. The predetermined site is as described above. The predetermined site can be identified by pattern matching. For example, the predetermined site relating to the vehicle in front can be identified by the sites having the same master pattern being associated with respect to the pixel groups of the tail lamp and the headlamp. In this case, the driver's seat-side site of the oncoming car may be identified on an assumption of a right-hand-drive car. The processing proceeds to Step S806 in the case of a "YES" determination result, and the processing proceeds to Step S808 in the case of a "NO" determination result.

In Step S806, the irradiation suppressed site detection unit 1012 of the first information generation unit 101 calculates coordinate values of four corners of a rectangle (refer to FIG. 8B) circumscribing the pixel group relating to the predetermined site of the j-th irradiation suppression target object.

In Step S808, the irradiation suppression target object detection unit 1011 of the first information generation unit 101 calculates coordinate values of four corners of a rectangle (the irradiation suppressed region) circumscribing the pixel group relating to the j-th irradiation suppression target object. For example, FIG. 8B shows four corners P1 to P4 of the rectangle circumscribing the pixel group relating to the pedestrian that is the irradiation suppression target object. In the following description, a region in the rectangle circumscribing the pixel group relating to the irradiation suppression target object or the predetermined site thereof will be referred to as the "irradiation suppressed region". As an example, in the following description, the information relating to the position of the irradiation suppression target object is represented in a two-dimensional coordinate system illustrated in FIG. 8B that has an X axis corresponding to the lateral direction of the image illustrated in FIG. 8B and a Y axis corresponding to the vertical direction of the image and has the upper-left corner of the image as its origin. The image that is illustrated in FIG. 8B corresponds to the image of the first image sensor 91 or the image of the second image sensor 92.

In Step S810, the first information generation unit 101 determines whether or not the value j is the value N1. In other words, the first information generation unit 101 determines whether or not the coordinate values of the four corners of the irradiation suppressed region have been calculated with respect to all the irradiation suppression target objects. The processing proceeds to Step S814 in the case of a "YES" determination result, and the processing proceeds to Step S812 in the case of a "NO" determination result.

In Step S812, the first information generation unit 101 increments the value j by "1" and performs the processing starting from Step S804. This allows the coordinate values of the four corners of the irradiation suppressed region to be calculated with respect to each of the irradiation suppression target objects in a case where the plurality of irradiation suppression target objects are detected.

In Step S814, the first information generation unit 101 generates the irradiation suppression target object information based on the result of the determination in Step S800 and the results of the calculations in Step S806 and Step S808. As described above, the irradiation suppression target object information includes the information relating to the presence or absence of the irradiation suppression target object and the information relating to the position of the irradiation suppression target object (the coordinate values of the four corners of the irradiation suppressed region).

Figure 9:
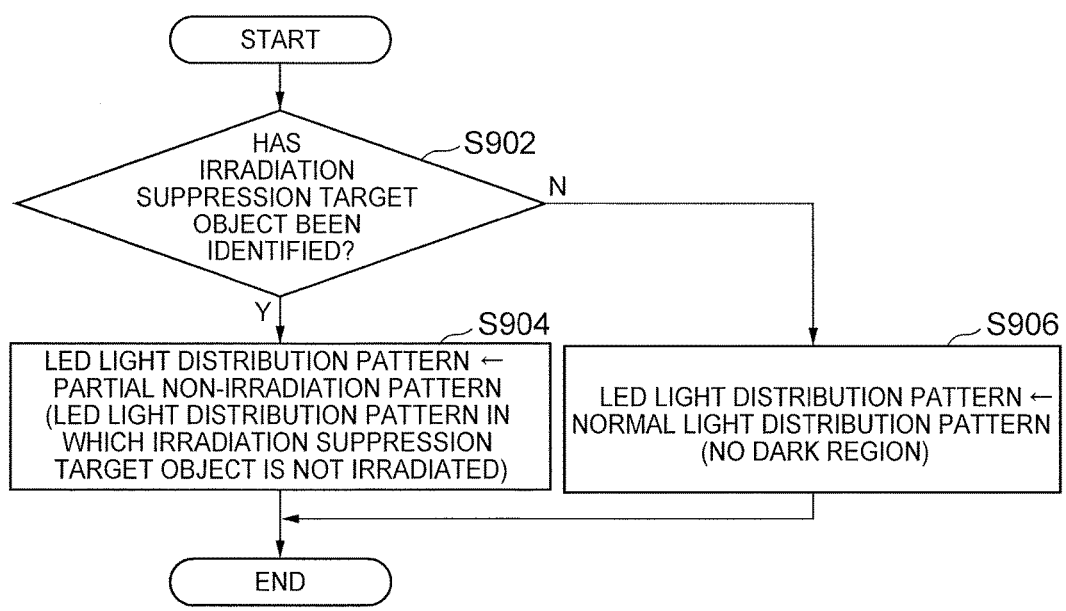
FIG. 9 is a flowchart illustrating an example of a LED light distribution pattern determination processing.

FIG. 9 is a flowchart illustrating an example of the LED light distribution pattern determination processing (Step S704).

In the following description, a positional relationship between the LED irradiation-enabled region (the same being applied to the other irradiation-enabled region, irradiation region, and dark region) and the object (such as the irradiation suppression target object) represents the same relationship on the image that is captured by the first image sensor 91 (or the second image sensor 92). Accordingly, in the following description, the positional relationship between the dark region and the object, for example, represents a positional relationship between the dark region on the imaginary vertical screen in the image captured by the first image sensor 91 and a region relating to the object in the same image.

In Step S902, the LED light distribution pattern determination unit 102 determines whether or not the irradiation suppression target object information obtained in Step S702 includes positional information on the irradiation suppression target object (positional information on the irradiation suppressed region). In other words, the LED light distribution pattern determination unit 102 determines whether or not the irradiation suppression target object has been identified by the first information generation unit 101. The processing proceeds to Step S904 in the case of a "YES"

determination result, and the processing proceeds to Step S906 in the case of a "NO" determination result.

In Step S904, the LED light distribution pattern determination unit 102 determines, as the LED light distribution pattern, the partial non-irradiation pattern in which the irradiation suppressed region is not irradiated (that is, the partial non-irradiation pattern in which the irradiation suppressed region is included in the dark region). For example, the LED light distribution pattern determination unit 102 determines the partial non-irradiation pattern based on the map data M1 that is illustrated in FIG. 10. In the example that is illustrated in FIG. 10, patterns (Patterns 1, 2, 3 . . . ) are associated with respective ranges of an X coordinate of the irradiation suppressed region. The respective patterns define, for example, those of the respective LEDs 231 to 240 of the LED unit 20L to be turned off. The respective ranges of the X coordinate correspond to respective X coordinate ranges of the LED irradiation-enabled regions A1 to A10 in the coordinate system of the image (refer to FIG. 8B). For example, the X coordinate range of d1 to d2 corresponds to the LED irradiation-enabled region A1, the X coordinate range of d2 to d3 corresponds to the LED irradiation-enabled region A2, and so on. In this case, the LED light distribution pattern determination unit 102 determines the partial non-irradiation pattern that is Pattern 1 in which the LED 231 is turned off as the LED light distribution pattern in a case where the X coordinate of the irradiation suppressed region pertains only to the range of d1 to d2. In a case where the X coordinate of the irradiation suppressed region pertains to the range of d1 to d2 and the range of d2 to d3, the LED light distribution pattern determination unit 102 determines, as the LED light distribution pattern, the partial non-irradiation pattern that is a combination of Pattern 1 in which the LED 231 is turned off and Pattern 2 in which the LED 232 is turned off. In a case where a plurality of the irradiation suppressed regions (the plurality of irradiation suppression target objects) are present, the partial non-irradiation pattern that has a plurality of the dark regions which are not successive in the lateral direction is determined as the LED light distribution pattern in some cases. In a case where the X coordinate of the first irradiation suppressed region pertains only to the range of d1 to d2 and the X coordinate of the second irradiation suppressed region pertains only to the range of d3 to d4, for example, the LED light distribution pattern determination unit 102 determines, as the LED light distribution pattern, the partial non-irradiation pattern that is a combination of Pattern 1 and Pattern 3 in which the LEDs 231, 233 are turned off. In other words, the LED light distribution pattern determination unit 102 determines the partial non-irradiation pattern in which the LED irradiation-enabled regions A1, A3 become the dark regions. In the following description, the plurality of dark regions that are not successive in the lateral direction as described above will be regarded as separate dark regions. Accordingly, the number of the dark regions that are included in the partial non-irradiation pattern is two or more in some cases.

In Step S906, the LED light distribution pattern determination unit 102 determines the normal light distribution pattern as the LED light distribution pattern. The normal light distribution pattern is as described above.

According to the processing that is illustrated in FIG. 9, the LED light distribution pattern of the LED unit 20L can be determined, based on the irradiation suppression target object information, such that the irradiation to the irradiation suppression target object by the LED unit 20L is suppressed.

Figure 11:
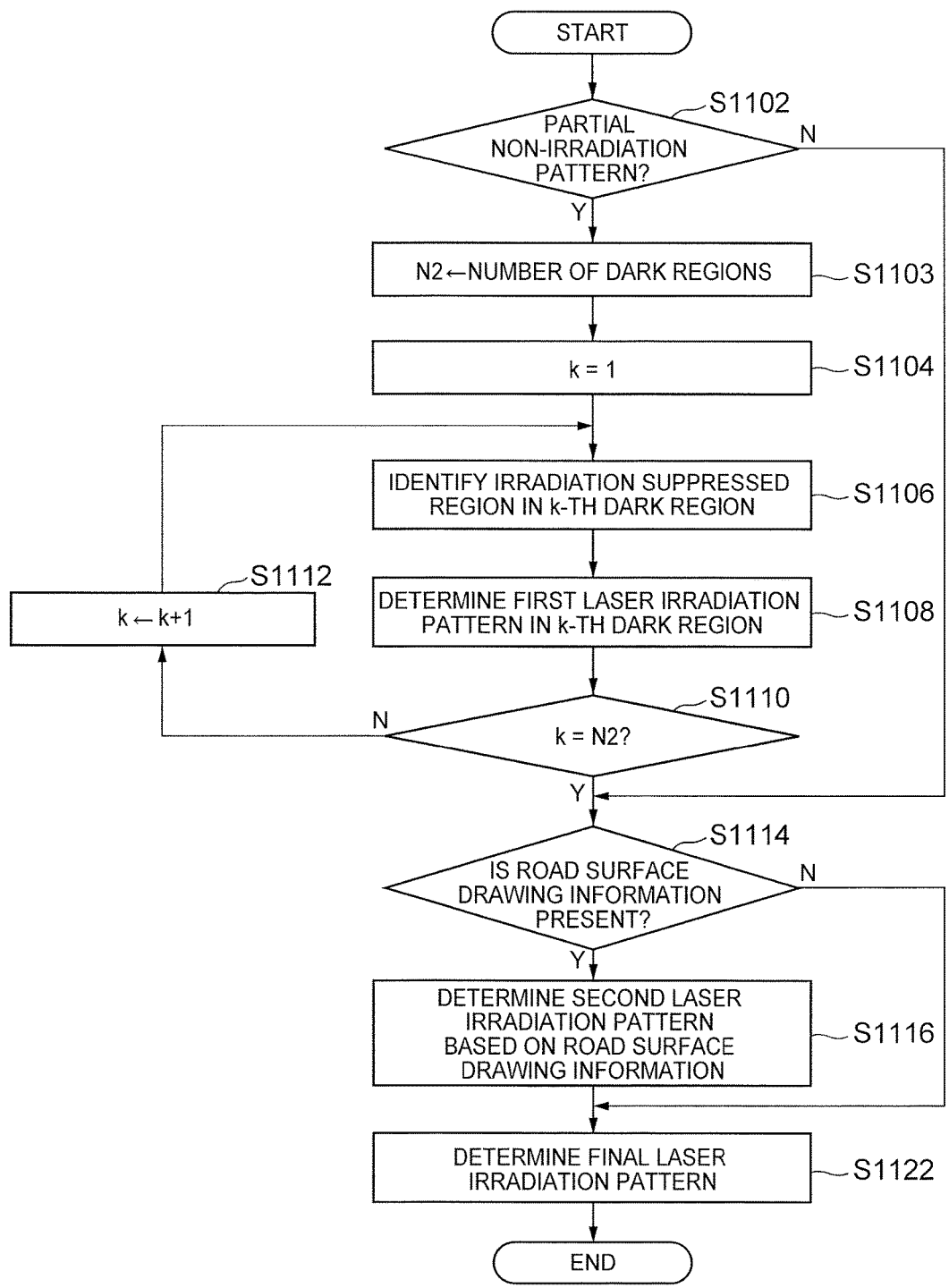
FIG. 11 is a flowchart illustrating an example of a laser light irradiation pattern determination processing according to the first embodiment.

FIG. 11 is a flowchart illustrating an example of the laser light irradiation pattern determination processing (Step S710).

In Step S1102, the laser irradiation pattern determination unit 105 determines whether or not the LED light distribution pattern obtained in Step S704 is the partial non-irradiation pattern. The processing proceeds to Step S1103 in the case of a "YES" determination result, and the processing proceeds to Step S1114 in the case of a "NO" determination result (that is, in a case where the LED light distribution pattern is the normal light distribution pattern).

In Step S1103, the laser irradiation pattern determination unit 105 sets a value N2 as the number of the dark regions included in the partial non-irradiation pattern.

In Step S1104, the laser irradiation pattern determination unit 105 sets a value k to "1".

In Step S1106, the laser irradiation pattern determination unit 105 selects the k-th dark region and identifies the irradiation suppressed region in the k-th dark region (the coordinate values of the four corners of the irradiation suppressed region). In a case where the number of the dark regions is two or more, for example, the laser irradiation pattern determination unit 105 sorts the dark regions in any order and selects the k-th dark region. The irradiation suppressed region (refer to FIG. 8B) can be identified based on the irradiation suppression target object information.

In Step S1108, the laser irradiation pattern determination unit 105 determines the first laser irradiation pattern with respect to the k-th dark region. The laser irradiation pattern determination unit 105 determines, as the first laser irradiation pattern with respect to the k-th dark region, the irradiation pattern in which the region of the k-th dark region excluding the irradiation suppressed region is irradiated. In other words, the laser irradiation pattern determination unit 105 determines, as the first laser irradiation pattern with respect to the k-th dark region, the irradiation pattern in which the irradiation suppressed region in the k-th dark region becomes a non-irradiation region and the region excluding the irradiation suppressed region becomes the irradiation region. The laser irradiation pattern determination unit 105 may determine the irradiation pattern in which the entire region of the k-th dark region excluding the irradiation suppressed region is irradiated as the first laser irradiation pattern with respect to the k-th dark region or may set a margin. In other words, the laser irradiation pattern determination unit 105 may determine the irradiation pattern in which the region of the k-th dark region excluding the irradiation suppressed region and separated by at least a predetermined margin from the irradiation suppressed region is irradiated as the first laser irradiation pattern with respect to the k-th dark region.

For example, the laser irradiation pattern determination unit 105 determines a scanning range on the phosphor 34 (the first laser irradiation pattern) based on a correspondence relationship (a coordinate transformation matrix H) between the coordinate system of the image (refer to FIG. 8B) and a coordinate system on the phosphor 34 (refer to FIG. 6A). The coordinate transformation matrix H is derived and stored in the storage unit 110 in advance. Herein, for example, an irradiation range based on the first laser irradiation pattern in the coordinate system of the image is a rectangular range that is surrounded by coordinates of four points (X1, Y1), (X2, Y2), (X3, Y3), and (X4, Y4). At this time, the scanning range on the phosphor 34 is a rectangular range that is surrounded by (x1, y1), (x2, y2), (x3, y3), and (x4, y4) in the coordinate system on the phosphor 34. Herein, (x1, y1), (x2, y2), (x3, y3), and (x4, y4) are as follows.

$$\begin{pmatrix} x1 \\ y1 \end{pmatrix} = H \cdot \begin{pmatrix} X1 \\ Y1 \end{pmatrix}$$

$$\begin{pmatrix} x2 \\ y2 \end{pmatrix} = H \cdot \begin{pmatrix} X2 \\ Y2 \end{pmatrix}$$

$$\begin{pmatrix} x3 \\ y3 \end{pmatrix} = H \cdot \begin{pmatrix} X3 \\ Y3 \end{pmatrix}$$

$$\begin{pmatrix} x4 \\ y4 \end{pmatrix} = H \cdot \begin{pmatrix} X4 \\ Y4 \end{pmatrix}$$

In Step S1110, the laser irradiation pattern determination unit 105 determines whether or not the value k is the value N2. In other words, the laser irradiation pattern determination unit 105 determines whether or not the first laser irradiation pattern with respect to all the dark regions has been determined. The processing proceeds to Step S1114 in the case of a "YES" determination result, and the processing proceeds to Step S1112 in the case of a "NO" determination result.

In Step S1112, the laser irradiation pattern determination unit 105 increments the value k by "1" and performs the processing starting from Step S1106. This allows the first laser irradiation pattern to be determined with respect to each of the dark regions in a case where the plurality of independent dark regions are included in the partial non-irradiation pattern.

In Step S1114, the laser irradiation pattern determination unit 105 determines whether or not the road surface drawing information has been generated in Step S708 of the current cycle. The processing proceeds to Step S1116 in the case of a "YES" determination result, and the processing proceeds to Step S1122 in the case of a "NO" determination result.

In Step S1116, the laser irradiation pattern determination unit 105 generates the second laser irradiation pattern based on the road surface drawing information. The second laser irradiation pattern is as described above.

In Step S1122, the laser irradiation pattern determination unit 105 determines a final laser irradiation pattern based on the laser irradiation pattern obtained in the current cycle. In a case where the laser irradiation pattern obtained in the current cycle is none but one or more first laser irradiation patterns, for example, the one or more first laser irradiation patterns become the final laser irradiation pattern. In a case where the laser irradiation pattern obtained in the current cycle is the one or more first laser irradiation patterns and the second laser irradiation pattern, a combination of the one or more first laser irradiation patterns and the second laser irradiation pattern becomes the final laser irradiation pattern. In a case where no laser irradiation pattern is obtained in the current cycle (for example, in a case where the determination results of both Step S1102 and Step S1114 are "NO"), the final laser irradiation pattern becomes "non-irradiation".

According to the processing that is illustrated in FIG. 11, the first laser irradiation pattern can be generated in which the vicinity of the irradiation suppressed region in the dark region is irradiated. In addition, when the road surface drawing information has been generated, the second laser irradiation pattern based on the road surface drawing information can be generated.

Figure 12:
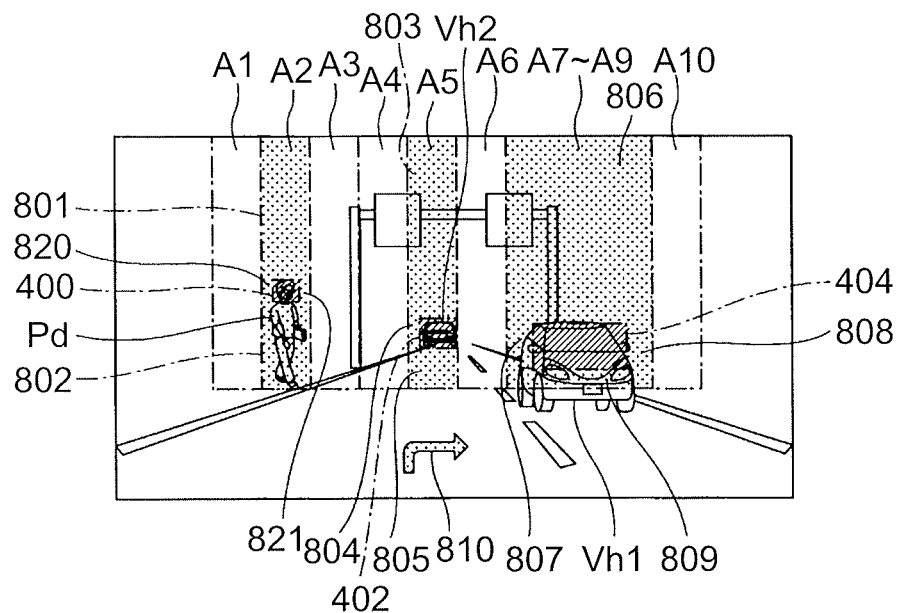
FIG. 12 is an explanatory diagram of a light distribution pattern that is realized by the light distribution control processing according to the first embodiment.
Figure 13:
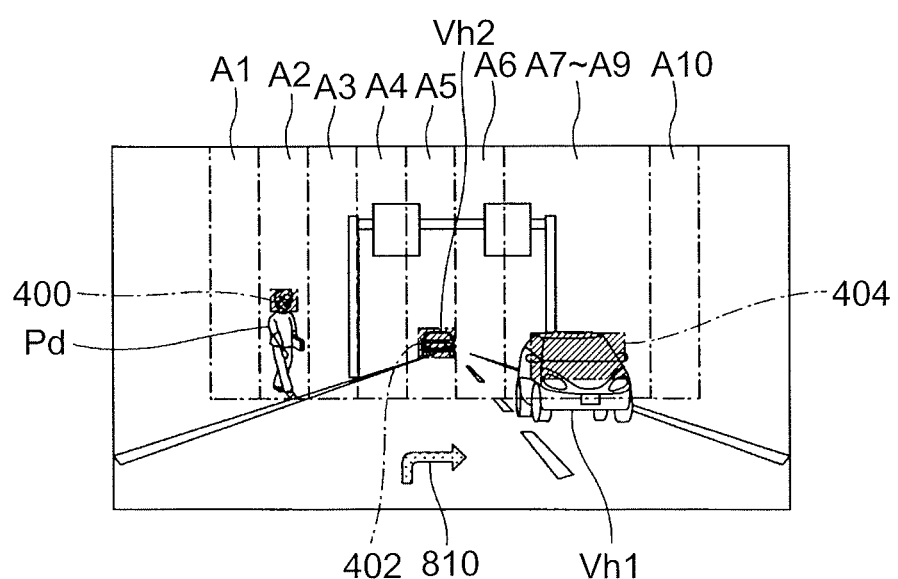
FIG. 13 is an explanatory diagram of an irradiation region that is realized by the light distribution pattern which is illustrated in FIG. 12.
Figure 14:
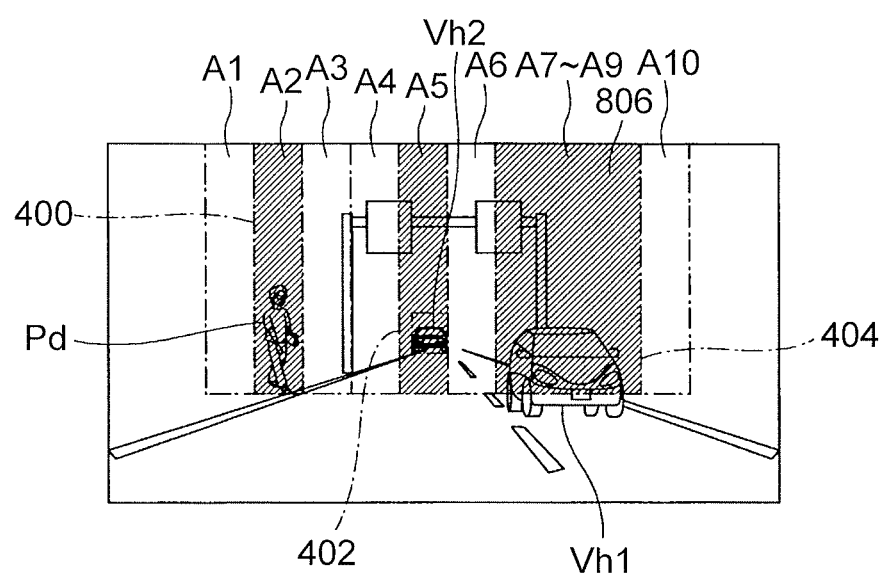
FIG. 14 is an explanatory diagram of an irradiation region that is realized by a light distribution control processing according to a comparative example.

FIG. 12 is an explanatory diagram of the light distribution pattern that is realized by the light distribution control processing (FIG. 7) according to the first embodiment. FIG. 13 is an explanatory diagram of the irradiation region that is realized by the light distribution pattern which is illustrated in FIG. 12. FIG. 14 is an explanatory diagram of an irradiation region that is realized by a light distribution control processing according to a comparative example. The comparative example has a configuration that is not provided with the laser units 30R, 30L. In other words, the comparative example has a configuration in which Step S708 to Step S712 illustrated in FIG. 7 are not executed. FIGS. 12 to 14 schematically show a scene in front of the host vehicle that is viewed by the host vehicle driver. Lines showing respective boundaries of the LED irradiation-enabled regions A1, A2, A3, A4, A5, A6, A10 of the LED unit 20L are illustrated by one-dot chain lines and the dark regions are illustrated by hatching of diagonal lines for descriptive purposes in FIGS. 12 to 14.

In the example that is illustrated in FIGS. 12 and 13, a scene is assumed in which a pedestrian Pd, an oncoming car Vh1, and a preceding car Vh2 are present in front of the host vehicle. Herein, a case is assumed where the irradiation suppression target object information including positional information on a face of the pedestrian Pd, positional information on the preceding car, and positional information on a front windshield glass of the oncoming car has been generated.

In this case, the partial non-irradiation pattern is determined in which the face of the pedestrian Pd, the entire preceding car, and the front windshield glass of the oncoming car are included in the respective dark regions as described above. Accordingly, in both the first embodiment and the comparative example, the partial non-irradiation pattern in which the LED irradiation-enabled regions A2, A5, A7, A8, A9 become the dark regions among the respective LED irradiation-enabled regions A1 to A10 is determined as the LED light distribution pattern as illustrated in FIGS. 12 and 13.

In the first embodiment, in contrast, the vehicle headlight device 1 is provided with the laser units 30R, 30L, the laser irradiation pattern determination unit 105, and the laser irradiation control unit 106 and Step S710 and Step S712 illustrated in FIG. 7 are executed. This allows the first laser irradiation pattern to be determined, as illustrated in FIG. 12, in which parts excluding the irradiation suppressed regions in the LED irradiation-enabled regions A2, A5, A7, A8, A9 that are the dark regions are irradiated. Specifically, the first laser irradiation pattern in which a region 801 above an irradiation suppressed region 400, a region 802 below the irradiation suppressed region 400, a region 820 to the left from the irradiation suppressed region 400, and a region 821 to the right from the irradiation suppressed region 400 are irradiated as parts excluding the irradiation suppressed region 400 relating to the face of the pedestrian Pd is determined with respect to the LED irradiation-enabled region A2 that is the dark region. In addition, the first laser irradiation pattern in which respective regions 803, 804, 805 above, to the left from, and below an irradiation suppressed region 402 are irradiated as parts excluding the irradiation suppressed region 402 relating to the preceding car is determined with respect to the LED irradiation-enabled region A5 that is the dark region. Furthermore, the first laser irradiation pattern in which respective regions 806, 807, 808, 809 above, to the left from, to the right from, and below an irradiation suppressed region 404 are irradiated as parts excluding the irradiation suppressed region 404 relating to the front windshield glass of the oncoming car is determined with respect to the LED irradiation-enabled regions A7 to A9 that are the dark regions.

Accordingly, in the first embodiment, the vicinity of the irradiation suppressed regions in the LED irradiation-enabled regions A2, A5, A7, A8, A9 can be illuminated, by the use of the laser units 30R, 30L, as illustrated in FIG. 13 instead of all the LED irradiation-enabled regions A2, A5, A7, A8, A9 that are the dark regions being dark. In the comparative example, in contrast, all the LED irradiation-enabled regions A2, A5, A7, A8, A9 that are the dark regions are dark and the vicinity of the irradiation suppressed regions remains dark as illustrated in FIG. 14.

In this manner, the first embodiment is capable of reducing a dazzle with respect to the irradiation suppression target object by the dark region and is capable of reducing a deterioration of the host vehicle driver's visibility attributable to the dark region. In addition, according to the first embodiment, the likelihood of setting of a narrow irradiation suppressed region is higher in a case where the predetermined site of the irradiation suppression target object is detected by the irradiation suppressed site detection unit 1012 than in a case where the predetermined site of the irradiation suppression target object is not detected. In a case where the narrow irradiation suppressed region is set, the deterioration of the host vehicle driver's visibility that is attributable to the dark region can be further reduced. Moreover, in the case where the predetermined site of the irradiation suppression target object is detected, even a part of the irradiation suppression target object can also be irradiated by the laser units 30R, 30L in some cases and, in this case, the deterioration of the host vehicle driver's visibility with respect to the irradiation suppression target object can be reduced as well.

Even in a comparative configuration that is provided with the laser units 30R, 30L but lacks the LED units 20R, 20L, the dazzle with respect to the irradiation suppression target object can be reduced and the deterioration of the host vehicle driver's visibility with respect to the vicinity of the irradiation suppressed region can be reduced at the same time by the region of the laser irradiation-enabled region B1 excluding the irradiation suppressed region being irradiated by the laser units 30R, 30L. This comparative configuration, however, has a problem because no high beam-equivalent irradiation can be realized in a case where the laser units 30R, 30L fail.

The first embodiment is provided with not only the laser units 30R, 30L but also the LED units 20R, 20L in this regard. Accordingly, even in the case of a failure of the laser units 30R, 30L, irradiation in the horizontal direction similar to a general high beam can be performed by the LED units 20R, 20L.

In the example that is illustrated in FIG. 12, the second laser irradiation pattern in which a region 810 corresponding to the road surface drawing information is irradiated is determined. Accordingly, the region 810 can become brighter than the vicinity and the road surface drawing information can be transmitted to the host vehicle driver as illustrated in FIG. 13.

In the example that is illustrated in FIGS. 12 and 13, the first laser irradiation pattern in which the region 801, the region 802, the region 820, and the region 821 are irradiated is determined with respect to the LED irradiation-enabled region A2 that is the dark region. However, the first laser irradiation pattern in which only one, two, or three of the region 801, the region 802, the region 820, and the region 821 are irradiated may be determined instead. Likewise, the first laser irradiation pattern in which only one or two of the regions 803, 804, 805 are irradiated may be determined with respect to the LED irradiation-enabled region A5 that is the dark region instead of the first laser irradiation pattern in which the regions 803, 804, 805 are irradiated being determined. Likewise, the first laser irradiation pattern in which only one, two, or three of the regions 806, 807, 808, 809 are irradiated may be determined with respect to the LED irradiation-enabled regions A7 to A9 that are the dark regions instead of the first laser irradiation pattern in which the regions 806, 807, 808, 809 are irradiated being determined.

Second Embodiment

Figure 15:
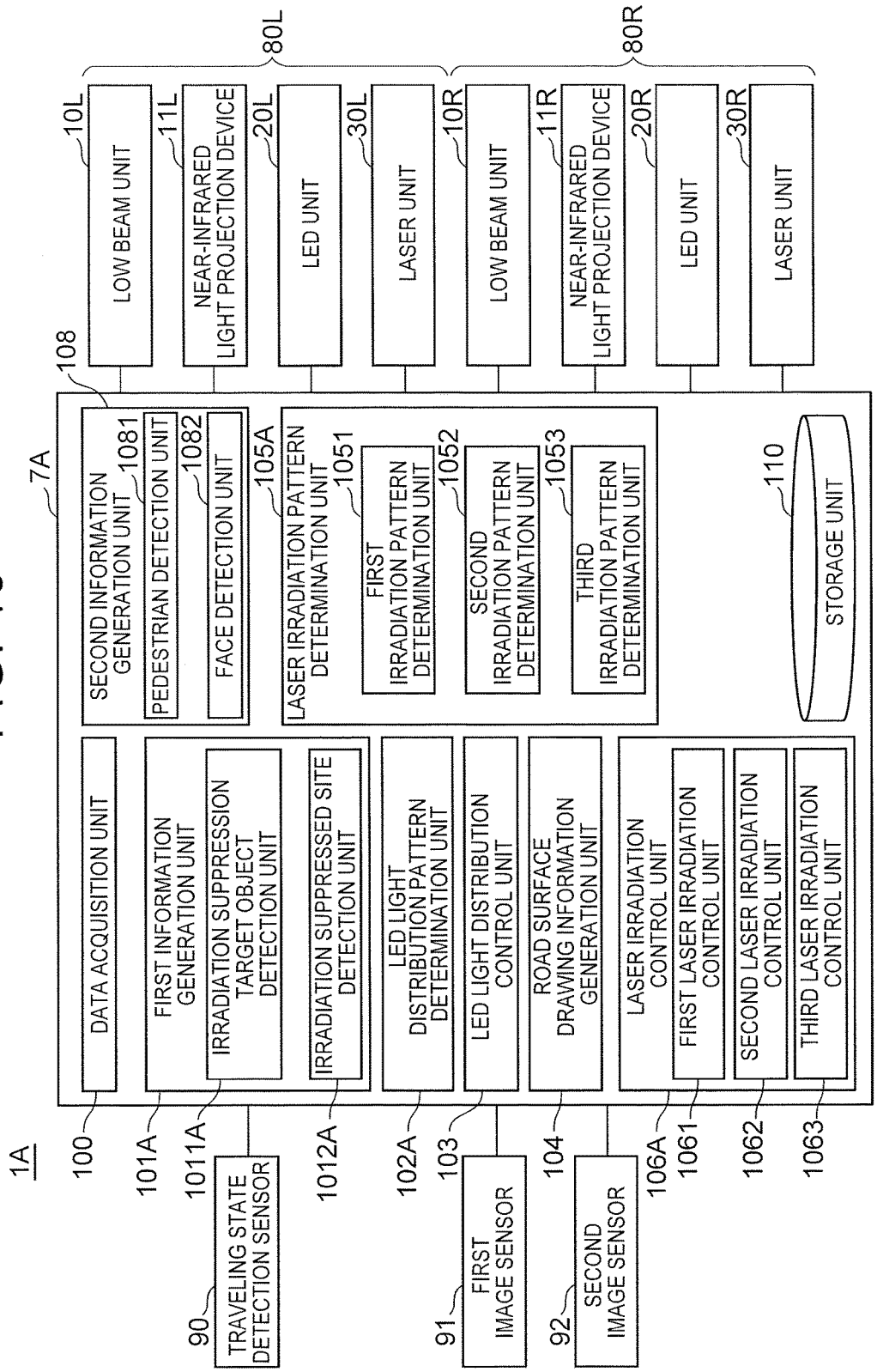
FIG. 15 is a diagram illustrating a configuration diagram of a vehicle headlight device according to a second embodiment of the invention.

FIG. 15 is a diagram illustrating a configuration diagram of a vehicle headlight device 1A according to a second embodiment of the invention.

The vehicle headlight device 1A differs from the vehicle headlight device 1 according to the first embodiment described above in that the control device 7 is replaced with a control device 7A in the vehicle headlight device 1A. The control device 7A differs from the control device 7 according to the first embodiment described above in that the first information generation unit 101 is replaced with a first information generation unit 101A, the LED light distribution pattern determination unit 102 is replaced with a LED light distribution pattern determination unit 102A, the laser irradiation pattern determination unit 105 is replaced with a laser irradiation pattern determination unit 105A, the laser irradiation control unit 106 is replaced with a laser irradiation control unit 106A, and a second information generation unit 108 is added in and to the control device 7A. The rest of the configuration of the control device 7A is identical to the rest of the configuration of the control device 7. The laser irradiation pattern determination unit 105A differs from the laser irradiation pattern determination unit 105 according to the first embodiment described above in that a third irradiation pattern determination unit 1053 is added to the laser irradiation pattern determination unit 105A. The laser irradiation control unit 106A differs from the laser irradiation control unit 106 according to the first embodiment described above in that a third laser irradiation control unit 1063 is added to the laser irradiation control unit 106A. In the following description of the second embodiment, the same reference numerals will be used to refer to the elements that are common to the first embodiment and the second embodiment, and description thereof will be omitted. Each unit of the control device 7A excluding the storage unit 110 can be realized by the CPU 11 that is illustrated in FIG. 2 executing the one or more programs which are stored in the ROM 13 that is illustrated in FIG. 2.

The first information generation unit 101A generates the irradiation suppression target object information based on the sensor information from the first image sensor 91 acquired by the data acquisition unit 100. The first information generation unit 101A includes an irradiation suppression target object detection unit 1011A and an irradiation suppressed site detection unit 1012A. In this second embodiment, the irradiation suppression target object is the vehicle in front (the preceding car and the oncoming car) and does not include the pedestrian. In other words, the irradiation suppression target object detection unit 1011A and the irradiation suppressed site detection unit 1012A differ from the irradiation suppression target object detection unit 1011 and the irradiation suppressed site detection unit 1012 according to the first embodiment described above only in that the irradiation suppression target object is the vehicle in front and does not include the pedestrian.

The LED light distribution pattern determination unit 102A determines the respective LED light distribution patterns of the LED units 20R, 20L based on the irradiation suppression target object information from the first information generation unit 101A (a result of detection by the first image sensor 91). In this second embodiment, the LED light distribution pattern determination unit 102A determines the partial non-irradiation pattern in which the irradiation suppressed region relating to the vehicle in front is included in the dark region only with respect to the vehicle in front (the preceding car and the oncoming car) and does not do so with respect to the pedestrian.

The third irradiation pattern determination unit 1053 determines the laser light irradiation patterns of the laser units 30R, 30L in which a part of the region (the irradiation region) that is irradiated by the LED units 20R, 20L is additionally irradiated. In the following description, the laser light irradiation pattern that is determined by the third irradiation pattern determination unit 1053 will be referred to as a "third laser irradiation pattern". Specifically, the third irradiation pattern determination unit 1053 determines the third laser irradiation pattern in which a site other than the pedestrian's face (such as a site below the face) is irradiated based on attention attraction target object information from the second information generation unit 108 (a result of identification by a face detection unit 1082). In addition, the third irradiation pattern determination unit 1053 determines the third laser irradiation pattern in which a partial dark region (specifically, a distant region) in the region irradiated by the LED units 20R, 20L is irradiated.

In a case where the third laser irradiation pattern has been determined by the third irradiation pattern determination unit 1053, the third laser irradiation control unit 1063 controls the laser units 30R, 30L based on that third laser irradiation pattern.

The second information generation unit 108 generates information relating to an attention attraction target object (hereinafter, referred to as the "attention attraction target object information") based on the sensor information from the second image sensor 92 acquired by the data acquisition unit 100. The attention attraction target object is the pedestrian. The attention attraction target object information includes information relating to whether the attention attraction target object is present or absent and information relating to a position of the attention attraction target object.

The second information generation unit 108 includes a pedestrian detection unit 1081 and the face detection unit 1082.

The pedestrian detection unit 1081 identifies the pedestrian in the irradiation-enabled regions of the LED units 20R, 20L based on the information (the image) from the second image sensor 92. A method for identifying the pedestrian is as described above.

The face detection unit 1082 identifies the face of the pedestrian identified by the pedestrian detection unit 1081. As described above, the pedestrian's face can be identified by pattern matching based on the image from the second image sensor 92. The pedestrian's face may also be identified (estimated) as an upper portion of the pixel group relating to the pedestrian.

Hereinafter, a processing that is executed by the control device 7A will be described with reference to FIGS. 16 to 18. In the following description, the light distribution control processing with respect to the headlight 80L will be described. The same is applied to the light distribution control processing with respect to the headlight 80R.

Figure 16:
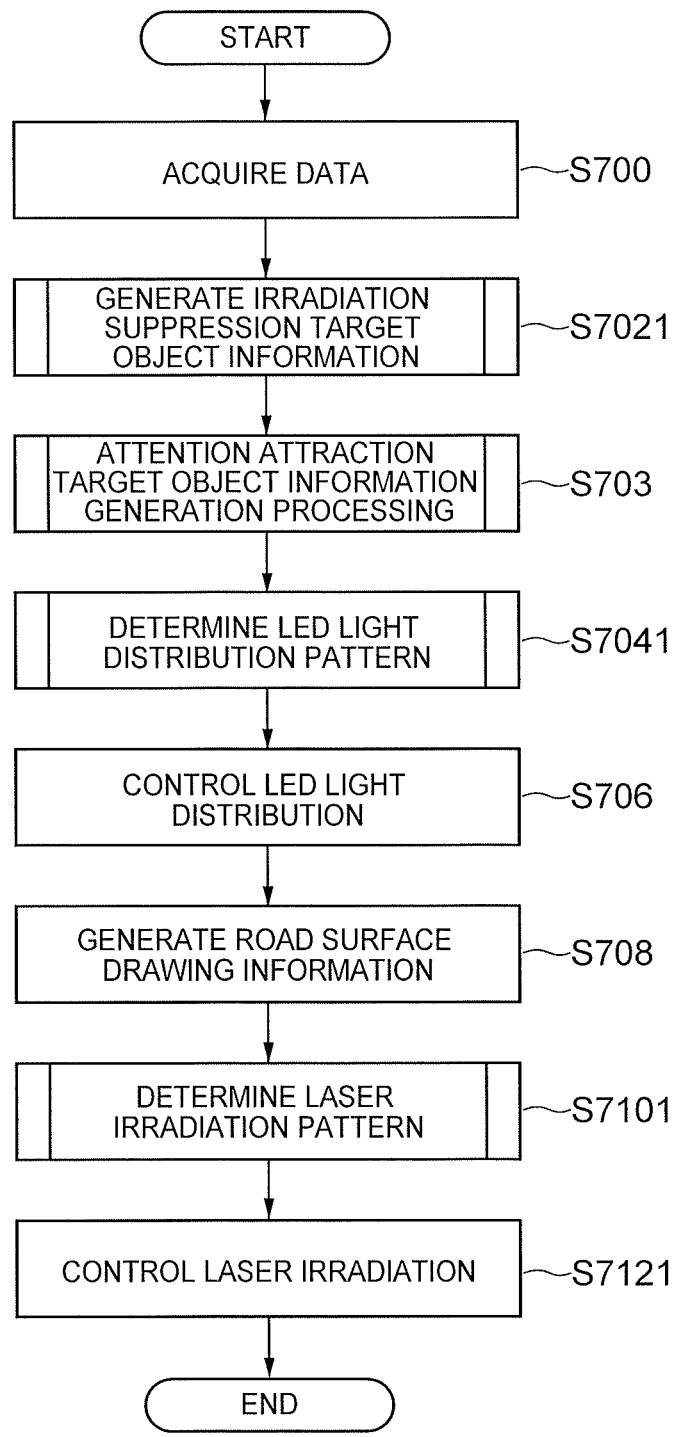
FIG. 16 is a flowchart illustrating an example of a light distribution control processing of a control device according to the second embodiment.

FIG. 16 is a flowchart illustrating an example of the light distribution control processing of the control device 7A. The light distribution control processing that is illustrated in FIG. 16 differs from the light distribution control processing that is illustrated in FIG. 7 according to the first embodiment described above in that Step S702 is replaced with Step S7021, Step S703 is added, Step S704 is replaced with Step S7041, Step S710 is replaced with Step S7101, and Step S712 is replaced with Step S7121 in and to the light distribution control processing that is illustrated in FIG. 16. The rest of the light distribution control processing that is illustrated in FIG. 16 is identical to the rest of the light distribution control processing that is illustrated in FIG. 7. As is the case with the light distribution control processing that is illustrated in FIG. 7, the light distribution control processing that is illustrated in FIG. 16 is repeatedly executed at predetermined time intervals in a case where, for example, the headlight 80L is turned ON and the light distribution control switch (not illustrated) is turned ON.

In Step S7021, the first information generation unit 101A generates the irradiation suppression target object information based on the sensor information obtained in Step S700. This processing differs from the processing that is illustrated in FIG. 8A only in that the pedestrian is not included in the irradiation suppression target object in this processing. Accordingly, further description thereof will be omitted.

In Step S703, the second information generation unit 108 generates the attention attraction target object information based on the sensor information obtained in Step S700. This processing differs from the processing that is illustrated in FIG. 8A only in that the "irradiation suppression target object" can be read as the "attention attraction target object (the pedestrian)". Accordingly, further description thereof will be omitted. Specifically, the pedestrian detection unit 1081 of the second information generation unit 108 determines whether or not the pixel group corresponding to the pedestrian is present in the irradiation-enabled region of the LED unit 20L (the entire LED irradiation-enabled region of the LED irradiation-enabled regions A1 to A10) based on the near-infrared image acquired by the second image sensor. In a case where the pixel group corresponding to the pedestrian is present, the face detection unit 1082 identifies the face (the predetermined site) of the pedestrian. In a case where the pedestrian's face cannot be identified by the face detection unit 1082, the second information generation unit 108 generates the coordinate values of the four corners of the rectangle circumscribing the pixel group relating to the pedestrian as the information relating to the position of the attention attraction target object. In a case where the pedestrian's face can be identified by the face detection unit 1082, the second information generation unit 108 generates the coordinate values of the four corners of the rectangle circumscribing the pixel group relating to the pedestrian's face as the information relating to the position of the attention attraction target object. Similarly to the above, the information relating to the position of the attention attraction target object is represented in the two-dimensional coordinate system illustrated in FIG. 8B that has the X axis corresponding to the lateral direction of the image illustrated in FIG. 8B and the Y axis corresponding to the vertical direction of the image and has the upper-left corner of the image as its origin.

In Step S7041, the LED light distribution pattern determination unit 102A performs the LED light distribution pattern determination processing based on the irradiation suppression target object information obtained in Step S7021. This processing differs from the processing of Step S704 described above only in that the partial non-irradiation pattern in which the irradiation suppressed region relating to the vehicle in front is included in the dark region is determined in this processing. Accordingly, further description thereof will be omitted.

In Step S7101, the laser irradiation pattern determination unit 105A performs the laser light irradiation pattern determination processing. The laser light irradiation pattern includes the first to third laser irradiation patterns as described above. The first irradiation pattern determination unit 1051 of the laser irradiation pattern determination unit 105A determines the first laser irradiation pattern based on the irradiation suppression target object information obtained in Step S7021 and the LED light distribution pattern obtained in Step S7041. In addition, the third irradiation pattern determination unit 1053 of the laser irradiation pattern determination unit 105A determines the third laser irradiation pattern based on the attention attraction target object information obtained in Step S703. An example of the laser light irradiation pattern determination processing will be described later.

In Step S7121, the laser irradiation control unit 106A controls the laser unit 30L based on the laser light irradiation pattern obtained in Step S7101. In this second embodiment, the third laser irradiation pattern is included in the laser light irradiation pattern obtained in Step S7101 in some cases.

Figure 17:
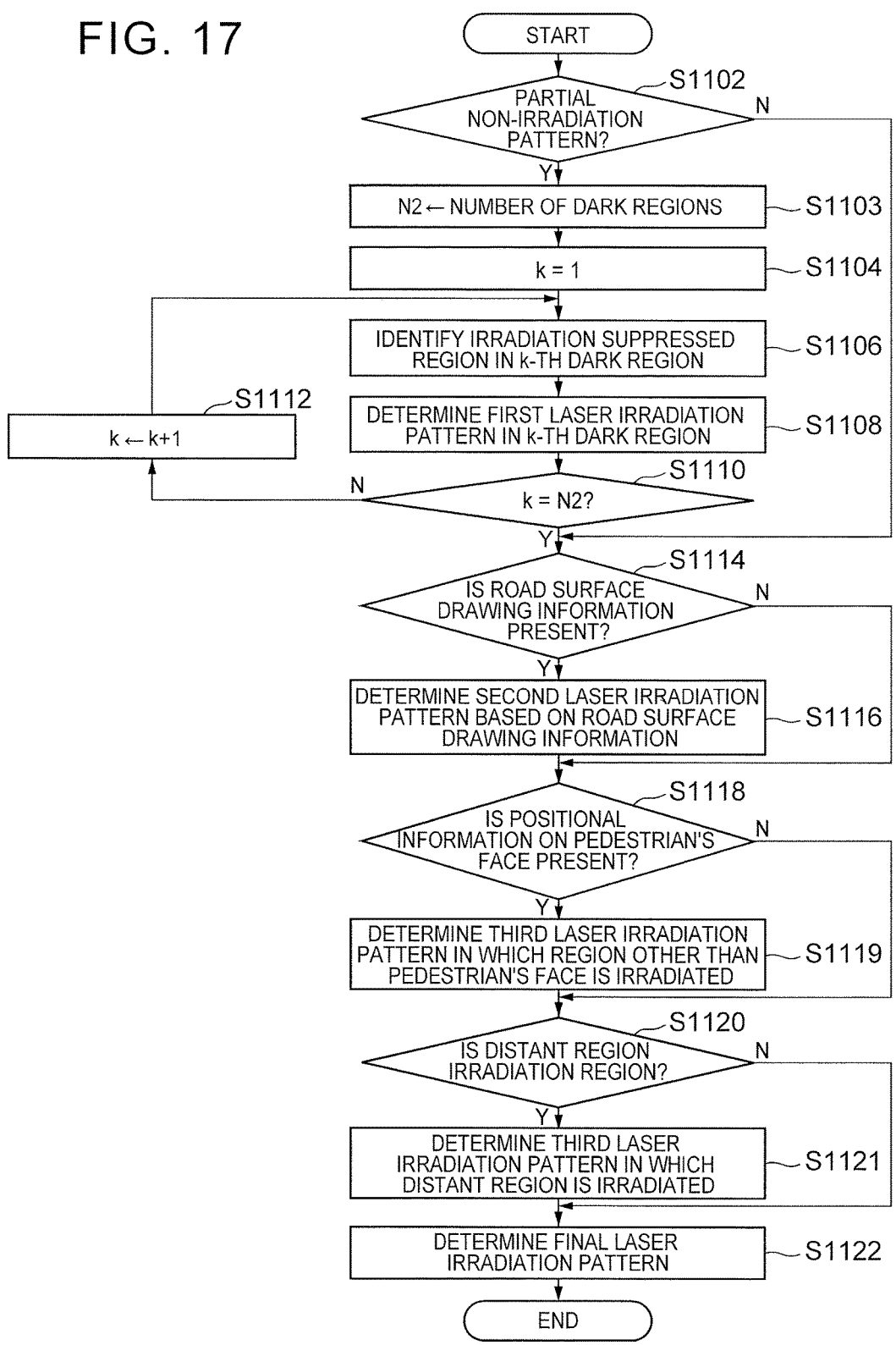
FIG. 17 is a flowchart illustrating an example of a laser light irradiation pattern determination processing according to the second embodiment.

FIG. 17 is a flowchart illustrating an example of the laser light irradiation pattern determination processing that is executed by the laser irradiation pattern determination unit 105A. The processing that is illustrated in FIG. 17 differs from the processing that is illustrated in FIG. 11 according to the first embodiment described above only in that the processing of Step S1118 to Step S1121 are added to this processing, and the rest of this processing is identical to the processing that is illustrated in FIG. 11. The following description will cover the difference.

The processing proceeds to Step S1116 in the case of a "YES" determination result in Step S1114. The processing proceeds to Step S1118 in the case of a "NO" determination result in Step S1114.

In Step S1118, the third irradiation pattern determination unit 1053 of the laser irradiation pattern determination unit 105A determines whether or not the attention attraction target object information includes the positional information on the face (the predetermined site) of the pedestrian. The processing proceeds to Step S1119 in the case of a "YES" determination result, and the processing proceeds to Step S1120 in the case of a "NO" determination result.

In Step S1119, the third irradiation pattern determination unit 1053 determines the third laser irradiation pattern in which a predetermined irradiation target region below the pedestrian's face is irradiated based on the attention attraction target object information. The predetermined irradiation target region corresponds to a region below the pedestrian's face in the LED irradiation-enabled region in which the pedestrian is included. The laser irradiation pattern determination unit 105A determines the scanning range (the third laser irradiation pattern) on the phosphor 34 by converting the coordinate values defining the predetermined irradiation target region in the coordinate system of the image to the coordinate system on the phosphor 34 with the coordinate transformation matrix H as described above.

In Step S1120, the third irradiation pattern determination unit 1053 determines whether or not the LED irradiation-enabled region corresponding to the distant region is the irradiation region of the LED unit 20L based on the LED light distribution pattern obtained in Step S7041. The LED irradiation-enabled region corresponding to the distant region is, for example, the LED irradiation-enabled regions A5, A6 and is defined in advance. In this case, the third irradiation pattern determination unit 1053 determines whether or not the LEDs 235, 236 corresponding to the LED irradiation-enabled regions A5, A6 are turned on. The processing proceeds to Step S1121 in the case of a "YES" determination result, and the processing proceeds to Step S1122 in the case of a "NO" determination result.

In Step S1121, the laser irradiation pattern determination unit 105A determines the third laser irradiation pattern in which the distant region is irradiated. The distant region is, for example, a region in the LED irradiation-enabled regions A5, A6 up to a predetermined height from the horizontal line. The scanning range (the third laser irradiation pattern) on the phosphor 34 with respect to the distant region is derived and stored in advance in the storage unit 110.

According to the processing that is illustrated in FIG. 17, the first laser irradiation pattern in which the vicinity of the vehicle in front in the dark region is irradiated can be generated. In addition, when the road surface drawing information has been generated, the second laser irradiation pattern based on the road surface drawing information can be generated. Furthermore, in a case where the positional information on the pedestrian's face is included in the attention attraction target object information, the third laser irradiation pattern in which the side below the pedestrian's face is irradiated can be generated. Moreover, the third laser irradiation pattern in which the distant region is irradiated can be generated in a case where the LED light distribution pattern is the normal light distribution pattern and in a case where the LED light distribution pattern is the partial non-irradiation pattern but the distant region is included in the irradiation region of the partial non-irradiation pattern.

Figure 18:
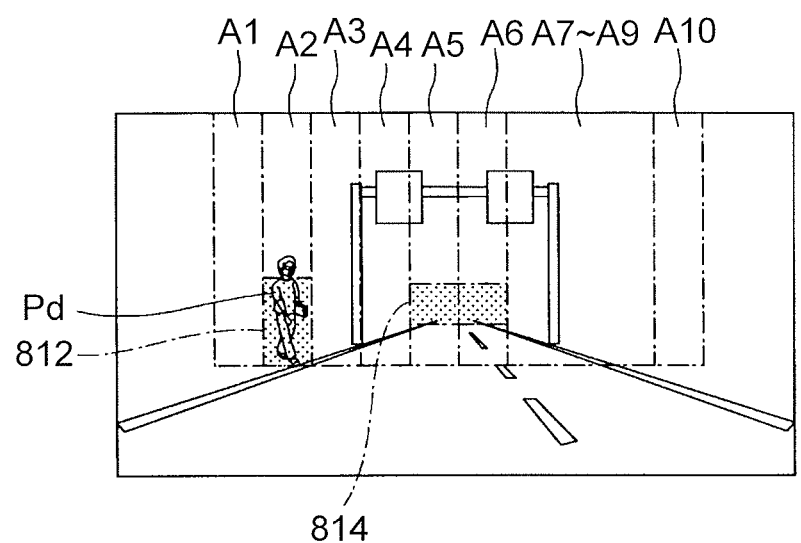
FIG. 18 is an explanatory diagram of a light distribution pattern that is realized by the light distribution control processing according to the second embodiment.

FIG. 18 is an explanatory diagram of the light distribution pattern that is realized by the light distribution control processing (FIG. 16) according to the second embodiment. Lines showing the respective boundaries of the LED irradiation-enabled regions A1, A2, A3, A4, A5, A6, A10 of the LED unit 20L are illustrated by one-dot chain lines and the irradiation regions of the third laser irradiation pattern are illustrated by "spot" hatching for descriptive purposes in FIG. 18.

In the example that is illustrated in FIG. 18, a scene is assumed in which the pedestrian Pd is present in front of the host vehicle. Herein, a case is assumed where the attention attraction target object information including the positional information on the face of the pedestrian Pd has been generated.

In the case of the second embodiment, the pedestrian Pd is not the irradiation suppression target object but the attention attraction target object as described above. Accordingly, the pedestrian Pd is basically included in the irradiation regions of the LED units 20R, 20L (because, in many cases, the pedestrian Pd is not present at a position overlapping the vehicle in front of the host vehicle). In addition, the LED light distribution pattern is the normal light distribution pattern in the example that is illustrated in FIG. 18. Accordingly, the distant region is included in the irradiation regions of the LED units 20R, 20L.

In this case, the third laser irradiation pattern in which the region of the pedestrian Pd below the face of the pedestrian Pd is irradiated is determined as described above. In addition, the third laser irradiation pattern in which the distant region is irradiated is determined. Specifically, the third laser irradiation pattern is determined, as illustrated in FIG. 18, in which a region 812 below the face of the pedestrian Pd in the LED irradiation-enabled region A2 including the pedestrian Pd is irradiated. Furthermore, the third laser irradiation pattern is determined in which a region 814 corresponding to the distant region in the LED irradiation-enabled regions A5, A6 is irradiated.

Accordingly, in this second embodiment, a part of the irradiation region of the LED units 20R, 20L can be illuminated by the use of the laser units 30R, 30L. Hence, the region 812 below the face of the pedestrian Pd can become brighter than its vicinity, which effectively allows the host vehicle driver to pay heed to the pedestrian. In addition, in a case where a region where a sufficiently high level of illuminance is unlikely to be ensured by the LED units 20R, 20L (the distant region in this second embodiment) is present, that region can be brightened and the visibility can be enhanced.

In the second embodiment, the region below the pedestrian's face may also be allowed to flicker during the irradiation of the region below the pedestrian's face based on the third laser irradiation pattern. This effectively allows the host vehicle driver to pay heed to the pedestrian.

Third Embodiment

Figure 19:
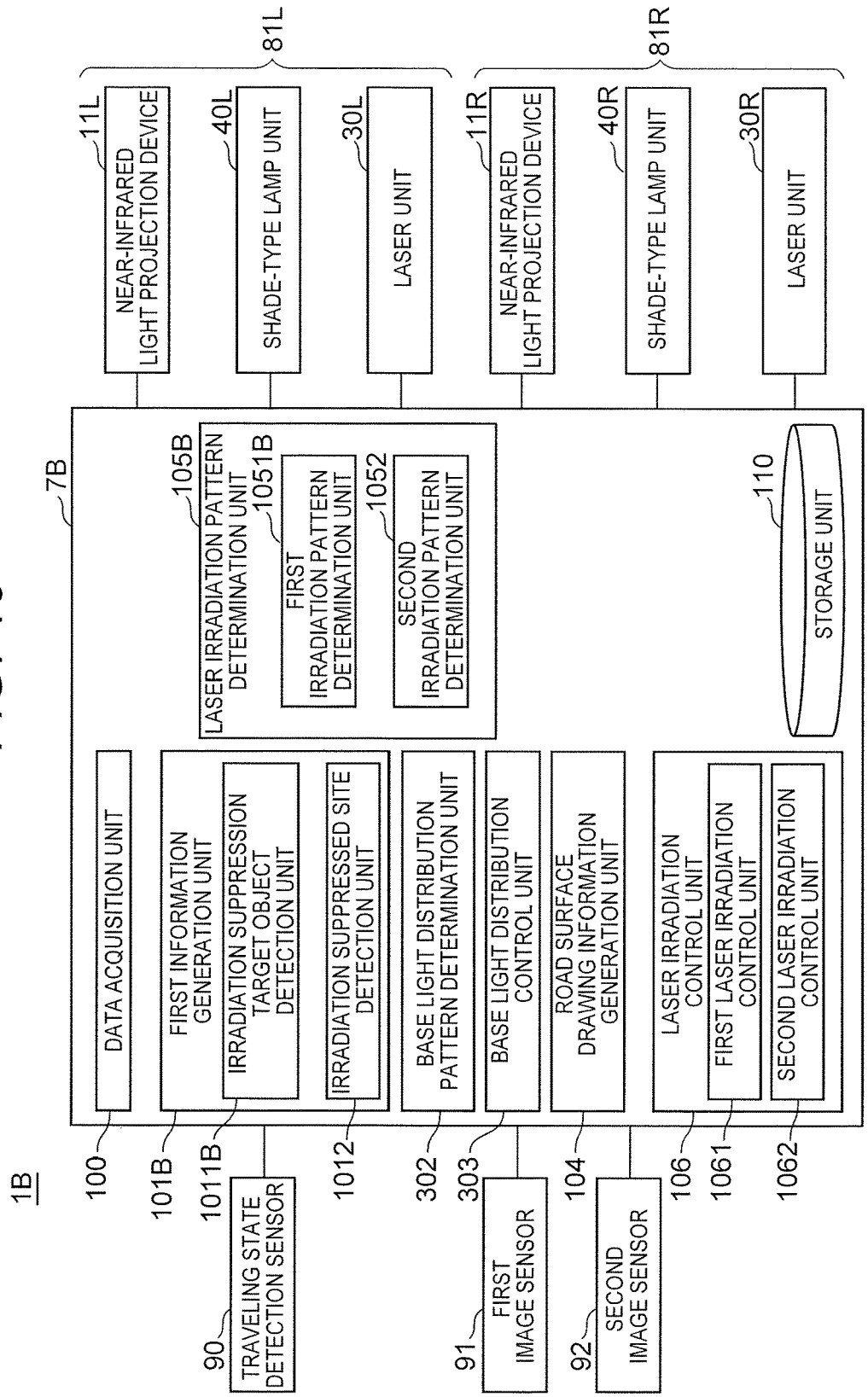
FIG. 19 is a diagram illustrating a configuration diagram of a vehicle headlight device according to a third embodiment of the invention.

FIG. 19 is a diagram illustrating a configuration diagram of a vehicle headlight device 1B according to a third embodiment of the invention.

The vehicle headlight device 1B differs from the vehicle headlight device 1 according to the first embodiment described above in that the control device 7 is replaced with a control device 7B and the headlights 80R, 80L are replaced with headlights 81R, 81L in the vehicle headlight device 1B. The headlights 81R, 81L differ from the headlights 80R, 80L according to the first embodiment described above in that the low beam units 10R, 10L and the LED units 20R, 20L are replaced with shade-type lamp units 40R, 40L in the headlights 81R, 81L. The control device 7B differs from the control device 7 according to the first embodiment described above in that the first information generation unit 101 is replaced with a first information generation unit 101B, the LED light distribution pattern determination unit 102 is replaced with a base light distribution pattern determination unit 302, the LED light distribution control unit 103 is replaced with a base light distribution control unit 303, and the laser irradiation pattern determination unit 105 is replaced with a laser irradiation pattern determination unit 105B in the control device 7B. The rest of the configuration of the control device 7B is identical to the rest of the configuration of the control device 7. The first information generation unit 101B differs from the first information generation unit 101 according to the first embodiment described above in that the irradiation suppression target object detection unit 1011 is replaced with an irradiation suppression target object detection unit 1011B in the first information generation unit 101B. The rest of the configuration of the first information generation unit 101B is identical to the rest of the configuration of the first information generation unit 101. The laser irradiation pattern determination unit 105B differs from the laser irradiation pattern determination unit 105 according to the first embodiment described above in that the first irradiation pattern determination unit 1051 is replaced with a first irradiation pattern determination unit 1051B in the laser irradiation pattern determination unit 105B. The rest of the configuration of the laser irradiation pattern determination unit 105B is identical to the rest of the configuration of the laser irradiation pattern determination unit 105. In the following description of the third embodiment, the same reference numerals will be used to refer to the elements that are common to the first embodiment and the third embodiment, and description thereof will be omitted. Each unit of the control device 7B excluding the storage unit 110 can be realized by the CPU 11 that is illustrated in FIG. 2 executing the one or more programs which are stored in the ROM 13 that is illustrated in FIG. 2.

The irradiation suppression target object detection unit 1011B identifies the irradiation suppression target object in the irradiation-enabled region following a high beam pattern of the shade-type lamp units 40R, 40L based on the information (the images) from the first image sensor 91 and the second image sensor 92.

The base light distribution pattern determination unit 302 determines respective light distribution patterns of the shade-type lamp units 40R, 40L (hereinafter, referred to as "base light distribution patterns") based on the irradiation suppression target object information from the first information generation unit 101B (a result of identification by the irradiation suppression target object detection unit 1011B). The base light distribution pattern refers to a pattern of the irradiation region that is formed by irradiation light of the shade-type lamp units 40R, 40L which is projected on an imaginary vertical screen in front of the shade-type lamp units 40R, 40L as is the case with the LED light distribution pattern described above. The base light distribution pattern selectively includes the high beam pattern, a low beam pattern, and a split beam pattern. A specific example of a method for determining the base light distribution pattern will be described later.

The base light distribution control unit 303 controls the respective light distribution patterns of the shade-type lamp units 40R, 40L in the base light distribution pattern determined by the base light distribution pattern determination unit 302. In other words, the base light distribution control unit 303 controls the shade-type lamp units 40R, 40L such that the base light distribution pattern determined by the base light distribution pattern determination unit 302 is realized. A specific example of a method for the control will be described later.

The first irradiation pattern determination unit 1051B determines the respective laser light irradiation patterns of the laser units 30R, 30L (the first laser irradiation pattern) based on the irradiation suppression target object information from the first information generation unit 101B and the base light distribution pattern determined by the base light distribution pattern determination unit 302. A specific example of a method for determining the first laser irradiation pattern will be described later.

Hereinafter, configurations of the shade-type lamp units 40R, 40L will be described with reference to FIGS. 20 to 22C.

Figure 20:
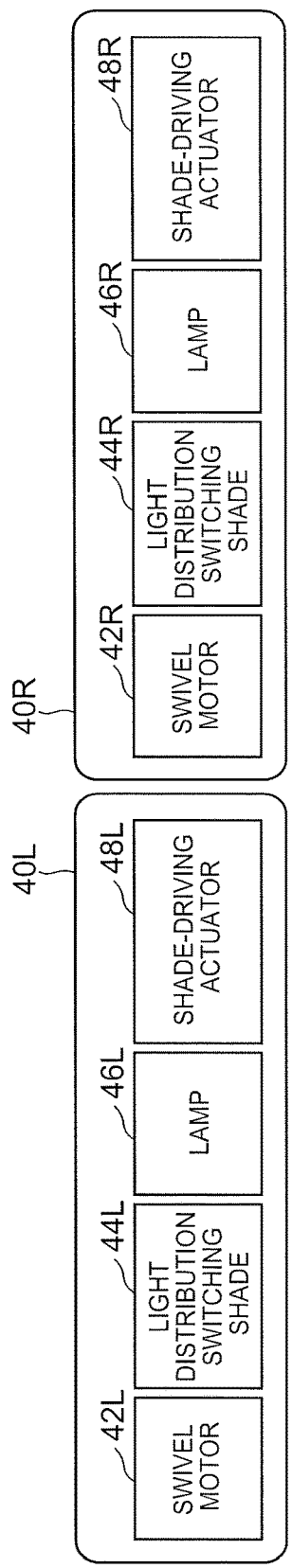
FIG. 20 is a diagram schematically illustrating a configuration of a shade-type lamp unit.

FIG. 20 is a diagram schematically illustrating the configurations of the shade-type lamp units 40R, 40L. The configuration of the shade-type lamp unit 40L that is illustrated in FIG. 20 is similar to the configuration of the shade-type lamp unit 40R.

The shade-type lamp unit 40L includes a swivel motor 42L, a light distribution switching shade (movable shade) 44L, a lamp (light source) 46L, and a shade-driving actuator 48L.

The swivel motor 42L changes an orientation of an optical axis of the shade-type lamp unit 40L within a substantially horizontal plane. The swivel motor 42L is attached to, for example, a lower bottom portion of a holder (not illustrated) of the shade-type lamp unit 40L. The orientation of the optical axis of the shade-type lamp unit 40L is changed within the substantially horizontal plane as the holder is driven to rotate (swivel) by the swivel motor 42L.

The light distribution switching shade 44L selectively generates the three types of patterns, that is, the high beam pattern, the low beam pattern, and the split beam pattern, by being driven to rotate by the shade-driving actuator 48L. An example of a structure of the light distribution switching shade 44L and an example of each of the beam patterns will be described later with reference to FIGS. 21A to 21C and FIGS. 22A to 22C.

The lamp 46L is formed by the use of a halogen lamp, a HID lamp, a LED lamp, or the like.

The shade-driving actuator 48L generates a driving force for the rotation of the light distribution switching shade 44L.

Figure 21A:
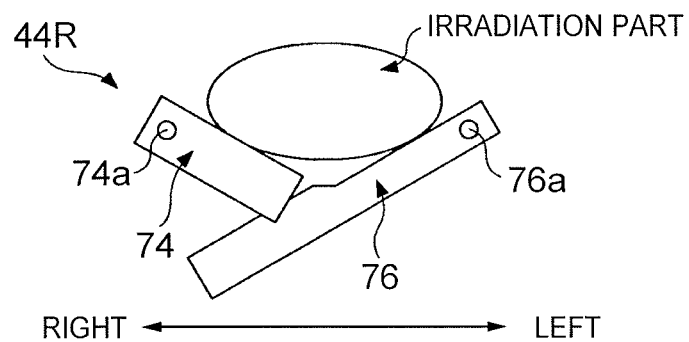
FIG. 21A is a diagram schematically illustrating an example of an operation of a light distribution switching shade.
Figure 21B:
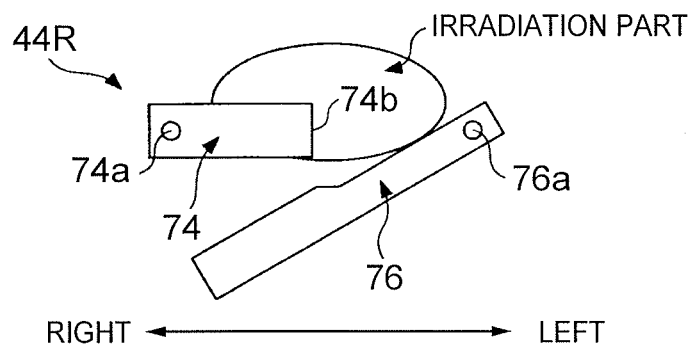
FIG. 21B is a diagram schematically illustrating an example of the operation of the light distribution switching shade.
Figure 21C:
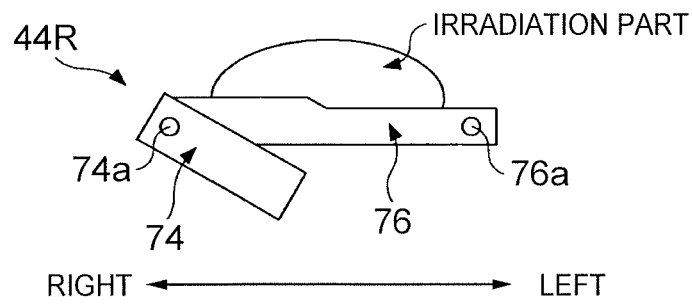
FIG. 21C is a diagram schematically illustrating an example of the operation of the light distribution switching shade.

FIGS. 21A to 21C are diagrams schematically illustrating an example of a light distribution switching shade 44R. FIGS. 21A to 21C are diagrams in which the light distribution switching shade 44R is seen in a direction of an optical axis from the space in front of the host vehicle. A configuration of the light distribution switching shade 44R is illustrated in FIGS. 21A to 21C and the light distribution switching shade 44L has substantially the same, bilaterally symmetrical, configuration as the light distribution switching shade 44R. FIGS. 21A to 21C schematically show a range of an irradiation part of the shade-type lamp unit 40R in its relationship with the light distribution switching shade 44R. The irradiation part is reversed by a lens (not illustrated). In FIG. 21, FIG. 21A shows a state of the light distribution switching shade 44R where the high beam pattern is formed, FIG. 21B shows a state of the light distribution switching shade 44R where the split beam pattern is formed, and FIG. 21C shows a state of the light distribution switching shade 44R where the low beam pattern is formed.

The light distribution switching shade 44R that is illustrated in FIGS. 21A to 21C is provided with a shade 74 for a one-side high beam and a shade 76 for a low beam as two sub-shades. The shade 74 for a one-side high beam has a length at which only one horizontal-direction side of a lower half of the irradiation part of the shade-type lamp unit 40R is shielded. The shade 74 for a one-side high beam is disposed on right and left opposite sides (outsides) in the shade-type lamp unit 40R such that a central side of the host vehicle is shielded. The shade 76 for a low beam, in contrast, has a length at which the entire lower half of the irradiation part of the shade-type lamp unit 40R in the horizontal direction is shielded. The shade 74 for a one-side high beam is supported to be capable of rotating about an axis of rotation 74a. The shade 76 for a low beam is supported to be capable of rotating about an axis of rotation 76a. The shade 74 for a one-side high beam and the shade 76 for a low beam are driven to rotate by a shade-driving actuator 48R (refer to FIG. 20) that is disposed with respect to each of the shade 74 for a one-side high beam and the shade 76 for a low beam. In this manner, each of the shade 74 for a one-side high beam and the shade 76 for a low beam is switchable in an independent manner between a retraction position and a shielding position.

Figure 22A:
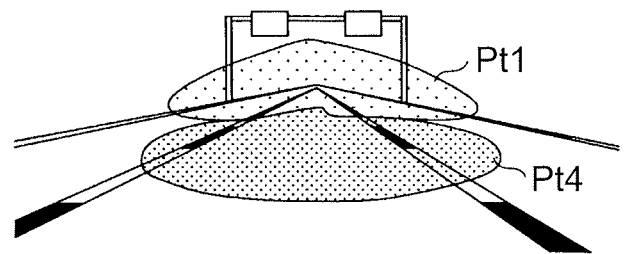
FIG. 22A is a diagram schematically illustrating an example of a high beam pattern irradiation region.
Figure 22B:
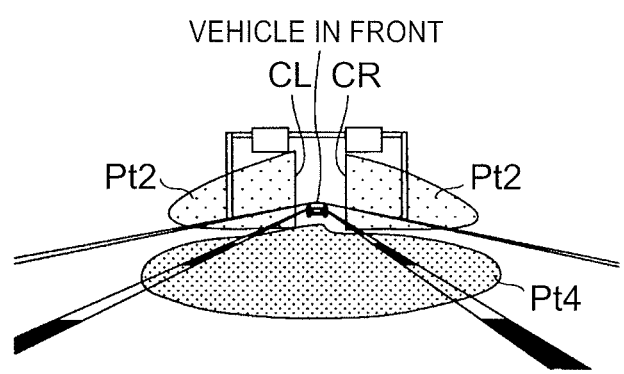
FIG. 22B is a diagram schematically illustrating an example of a split beam pattern irradiation region.
Figure 22C:
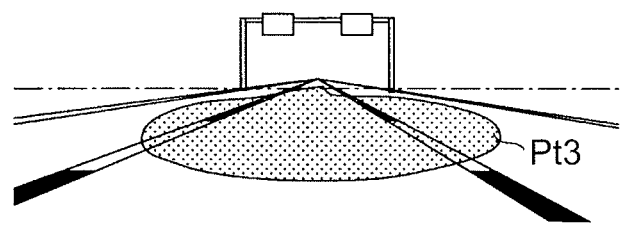
FIG. 22C is a diagram schematically illustrating an example of a low beam pattern irradiation region.

FIGS. 22A to 22C are diagrams schematically illustrating an example of the irradiation region that is realized by the shade-type lamp units 40R, 40L. FIGS. 22A to 22C show a schematic irradiation region at the time when the front of the host vehicle is seen from the driver's point of view.

FIG. 22A shows an example of a high beam pattern irradiation region. A high beam pattern irradiation region Pt1 is formed by the shades 74 for a one-side high beam and the shades 76 for a low beam of both of the right and left shade-type lamp units 40R, 40L being held at the retraction position (refer to FIG. 21A). As illustrated in FIG. 22A, an irradiation region Pt4 that is equivalent to an irradiation region Pt3 of the low beam pattern (refer to FIG. 22C) is additionally formed below the high beam pattern irradiation region Pt1. In this manner, the shade-type lamp units 40R, 40L emit high beam light to the space in front of the host vehicle along an optical axis above the low beam when irradiation using the high beam pattern is performed.

FIG. 22B shows an example of a split beam pattern irradiation region. FIG. 22B shows cut-off lines CR, CL bounded by an edge portion 74b (refer to FIG. 21B) of the shade 74 for a one-side high beam. A split beam pattern irradiation region Pt2 is formed by the shades 74 for a one-side high beam of the right and left shade-type lamp units 40R, 40L being held at the shielding position and the shades 76 for a low beam of the shade-type lamp units 40R, 40L being held at the retraction position (refer to FIG. 21B). The split beam pattern irradiation region Pt2 is a pattern in which a partial region in the high beam pattern irradiation region Pt1 is shielded with the cut-off lines CR, CL acting as boundaries. In the example that is illustrated in FIG. 22B, the split beam pattern irradiation region Pt2 is the high beam pattern irradiation region Pt1 that has a region on a central side in the right-to-left direction shielded. In this manner, the dark region is formed between the cut-off lines CR, CL in the right-to-left direction in the split beam pattern. Positions of the cut-off lines CR, CL in the right-to-left direction vary as swivel angles (that is, the orientation of the optical axes) of the right and left shade-type lamp units 40R, 40L are controlled. Likewise, the irradiation region Pt4 that is equivalent to the irradiation region Pt3 of the low beam pattern (refer to FIG. 22C) is additionally formed below the split beam pattern irradiation region Pt2 as illustrated in FIG. 22B. In this manner, the shade-type lamp units 40R, 40L emit the high beam light to the space in front of the host vehicle along the optical axis above the low beam when irradiation using the split beam pattern is performed.

FIG. 22C shows an example of a low beam pattern irradiation region. The low beam pattern irradiation region Pt3 is formed by the shades 74 for a one-side high beam of the shade-type lamp units 40R, 40L being held at the retraction position and the shades 76 for a low beam of the right and left shade-type lamp units 40R, 40L being held at the shielding position (refer to FIG. 21C).

Hereinafter, a processing that is executed by the control device 7B will be described with reference to FIGS. 23 to 25. In the following description, the light distribution control processing with respect to the headlight 81L will be described. The same is applied to the light distribution control processing with respect to the headlight 81R.

Figure 23:
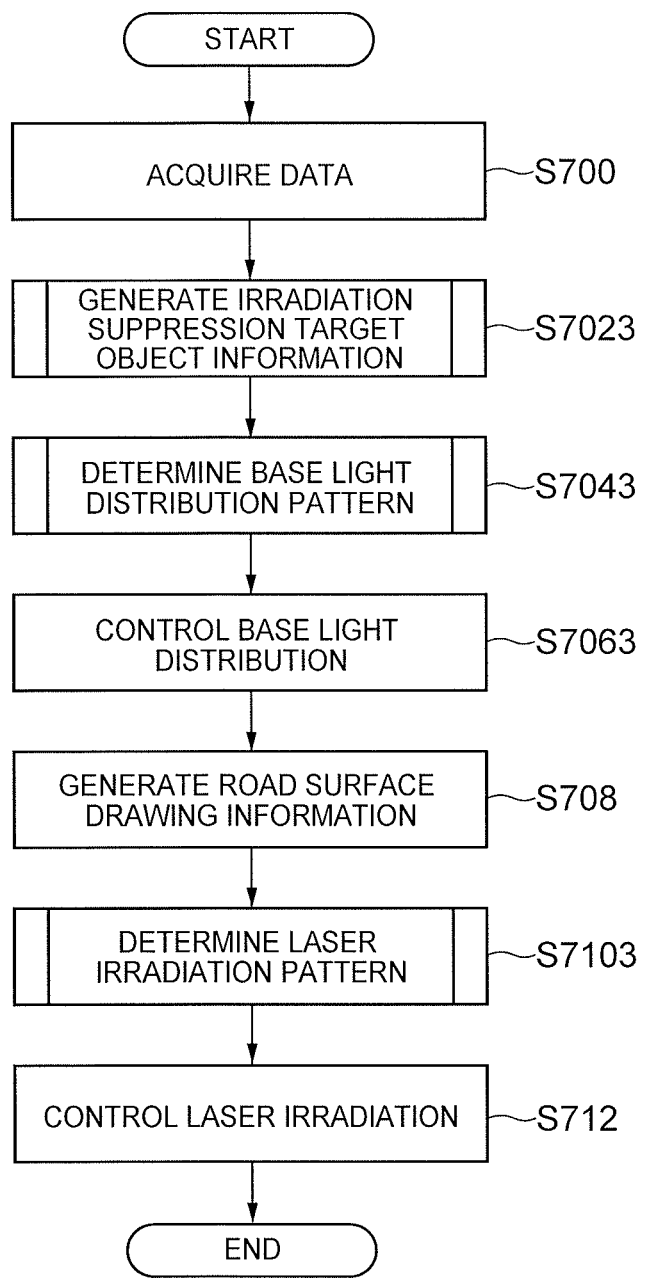
FIG. 23 is a flowchart illustrating an example of a light distribution control processing of a control device according to the third embodiment.

FIG. 23 is a flowchart illustrating an example of the light distribution control processing of a control device 7B. The light distribution control processing that is illustrated in FIG. 23 differs from the light distribution control processing that is illustrated in FIG. 7 according to the first embodiment described above in that Step S702 is replaced with Step S7023, Step S704 is replaced with Step S7043, Step S706 is replaced with Step S7063, and Step S710 is replaced with Step S7103 in the light distribution control processing that is illustrated in FIG. 23. The rest of the light distribution control processing that is illustrated in FIG. 23 is identical to the rest of the light distribution control processing that is illustrated in FIG. 7. As is the case with the light distribution control processing that is illustrated in FIG. 7, the light distribution control processing that is illustrated in FIG. 23 is repeatedly executed at predetermined time intervals in a case where, for example, the headlight 81L is turned ON and the light distribution control switch (not illustrated) is turned ON.

In Step S7023, the first information generation unit 101B performs the irradiation suppression target object information generation processing based on the sensor information obtained in Step S700. The irradiation suppression target object information generation processing differs from the processing that is illustrated in FIG. 8A according to the first embodiment described above only in that the search region for the identification of the irradiation suppression target object (refer to Step S800) is the irradiation-enabled region following the high beam pattern of the shade-type lamp unit 40L (a region corresponding to the irradiation region Pt1), instead of the irradiation-enabled region of the LED unit 20L (the entire LED irradiation-enabled region of the LED irradiation-enabled regions A1 to A10), in the irradiation suppression target object information generation processing. Accordingly, further detailed description thereof will be omitted.

In Step S7043, the base light distribution pattern determination unit 302 performs a base light distribution pattern determination processing based on the irradiation suppression target object information obtained in Step S7023. The base light distribution pattern selectively includes the high beam pattern, the low beam pattern, and the split beam pattern as described above. An example of the base light distribution pattern determination processing will be described later.

In Step S7063, the base light distribution control unit 303 controls the shade-type lamp unit 40L based on the base light distribution pattern obtained in Step S7043. When the base light distribution pattern obtained in Step S7043 is the high beam pattern, for example, the base light distribution control unit 303 forms the high beam pattern (FIG. 22A) by controlling the shade-driving actuator 48L (and the light distribution switching shade 44L associated with the shade-driving actuator 48L). When the base light distribution pattern obtained in Step S7043 is the low beam pattern, the base light distribution control unit 303 forms the low beam pattern (FIG. 22C) by controlling the shade-driving actuator 48L (and the light distribution switching shade 44L associated with the shade-driving actuator 48L). When the base light distribution pattern obtained in Step S7043 is the split beam pattern, the base light distribution control unit 303 forms the split beam pattern (FIG. 22B) by controlling the shade-driving actuator 48L (and the light distribution switching shade 44L associated with the shade-driving actuator 48L) and the swivel motor 42L.

In Step S7103, the laser irradiation pattern determination unit 105B performs the laser light irradiation pattern determination processing. As described above, the laser light irradiation pattern includes the first laser irradiation pattern and the second laser irradiation pattern. The first irradiation pattern determination unit 1051B of the laser irradiation pattern determination unit 105B determines the first laser irradiation pattern based on the irradiation suppression target object information obtained in Step S7023 and the base light distribution pattern obtained in Step S7043. An example of the laser light irradiation pattern determination processing will be described later.

Figure 24:
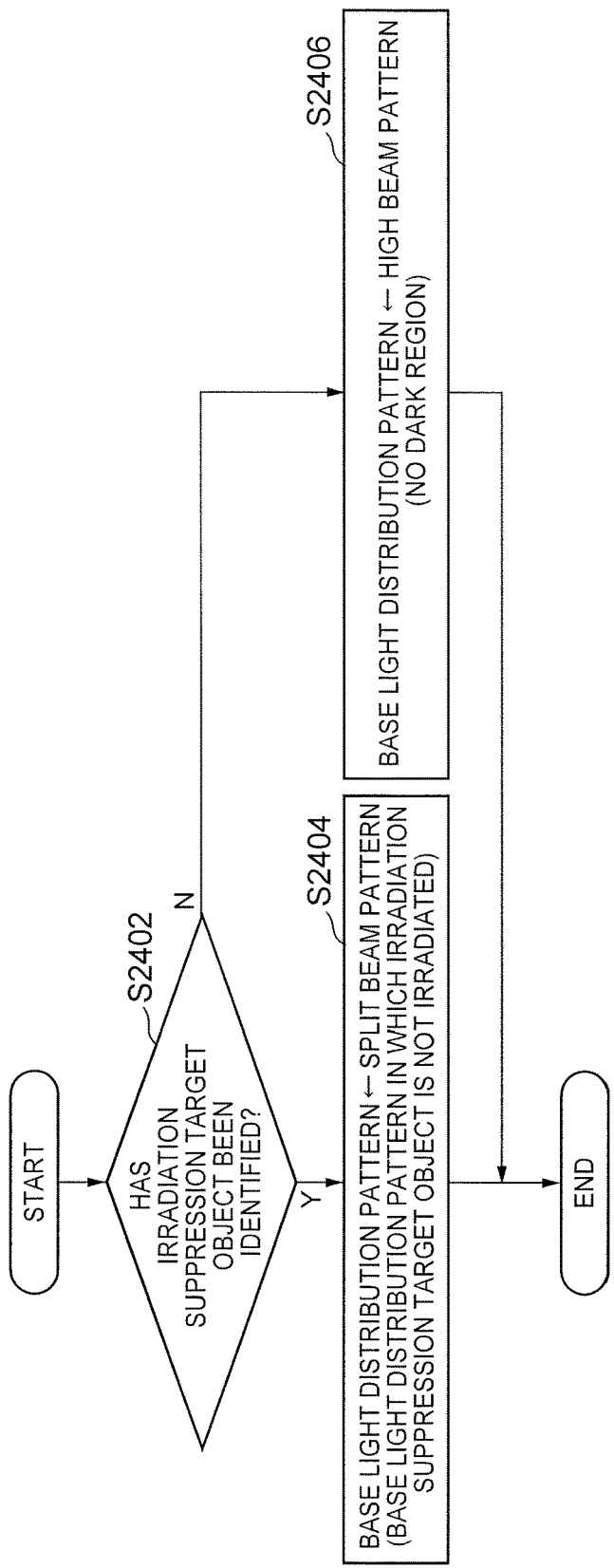
FIG. 24 is a flowchart illustrating an example of a base light distribution pattern determination processing.

FIG. 24 is a flowchart illustrating an example of the base light distribution pattern determination processing (Step S7043).

In Step S2402, the base light distribution pattern determination unit 302 determines whether or not the irradiation suppression target object information obtained in Step S702 includes the positional information on the irradiation suppression target object (the irradiation suppressed region). In other words, the base light distribution pattern determination unit 302 determines whether or not the irradiation suppression target object has been identified by the first information generation unit 101B. The processing proceeds to Step S2404 in the case of a "YES" determination result, and the processing proceeds to Step S2406 in the case of a "NO" determination result.

In Step S2404, the base light distribution pattern determination unit 302 determines the split beam pattern in which the irradiation suppression target object is not irradiated as the base light distribution pattern. Specifically, the base light distribution pattern determination unit 302 determines, as the base light distribution pattern, the split beam pattern in which the cut-off line CL comes outside each X coordinate range of the one or more identified irradiation suppressed regions.

In Step S2406, the base light distribution pattern determination unit 302 determines the high beam pattern as the base light distribution pattern.

According to the processing that is illustrated in FIG. 24, the base light distribution pattern of the shade-type lamp unit 40L can be determined, based on the irradiation suppression target object information, such that irradiation to the irradiation suppression target object by the shade-type lamp unit 40L is suppressed.

Figure 25:
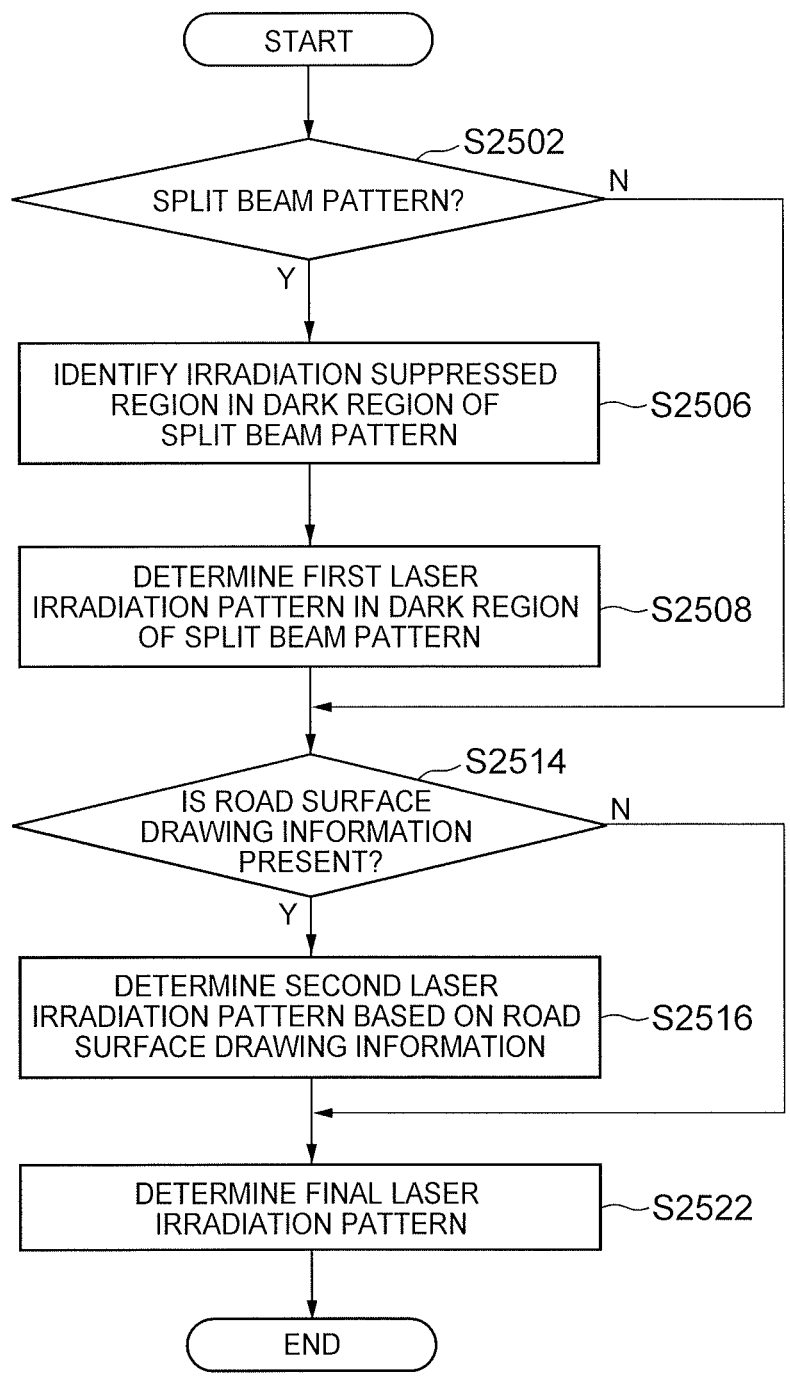
FIG. 25 is a flowchart illustrating an example of a laser light irradiation pattern determination processing.

FIG. 25 is a flowchart illustrating an example of the laser light irradiation pattern determination processing (Step S7103).

In Step S2502, the laser irradiation pattern determination unit 105B determines whether or not the base light distribution pattern obtained in Step S7043 is the split beam pattern. The processing proceeds to Step S2506 in the case of a "YES" determination result, and the processing proceeds to Step S2514 in the case of a "NO" determination result.

In Step S2506, the laser irradiation pattern determination unit 105B identifies the irradiation suppressed region in the dark region of the base light distribution pattern. The irradiation suppressed region (refer to FIG. 8B) can be identified based on the irradiation suppression target object information.

In Step S2508, the laser irradiation pattern determination unit 105B determines the first laser irradiation pattern with respect to the dark region of the base light distribution pattern. The laser irradiation pattern determination unit 105B determines, as the first laser irradiation pattern with respect to the dark region, the irradiation pattern in which the region excluding the irradiation suppressed region in the dark region of the base light distribution pattern is irradiated. The dark region of the split beam pattern corresponds to a region between the cut-off lines CR, CL in the right-to-left direction. A position of the dark region in the coordinate system of the image (refer to FIG. 8B) can be derived in accordance with each position of the cut-off lines CR, CL. The laser irradiation pattern determination unit 105B may determine the irradiation pattern in which the entire region of the dark region excluding the irradiation suppressed region is irradiated as the first laser irradiation pattern with respect to the dark region or may set a margin. In other words, the laser irradiation pattern determination unit 105B may determine the irradiation pattern in which the region of the dark region excluding the irradiation suppressed region and separated by at least a predetermined margin from the irradiation suppressed region is irradiated as the first laser irradiation pattern with respect to the dark region. An irradiation range based on the first laser irradiation pattern in the coordinate system of the image can be converted to an irradiation range (a scanning range) in the coordinate system on the phosphor 34 based on the coordinate transformation matrix H as described above.

The processing of Step S2514 to Step S2522 is identical to the processing of Step S1114 to Step S1122 illustrated in FIG. 11, respectively.

According to the processing that is illustrated in FIG. 25, the first laser irradiation pattern in which the vicinity of the irradiation suppressed region in the dark region is irradiated can be generated. In addition, when the road surface drawing information has been generated, the second laser irradiation pattern based on the road surface drawing information can be generated.

According to the third embodiment, effects similar to those of the first embodiment described above can be achieved. In other words, the third embodiment is capable of reducing the dazzle with respect to the irradiation suppression target object by the dark region and is capable of reducing the deterioration of the host vehicle driver's visibility attributable to the dark region. Specifically, the third embodiment is capable of reducing the dazzle with respect to the irradiation suppression target object by the split beam pattern. In addition, the first laser irradiation pattern is determined in which a part of the dark region by the split beam pattern excluding the irradiation suppressed region is irradiated, and thus the deterioration of the host vehicle driver's visibility that is attributable to the dark region can be reduced. Furthermore, similarly to the above, the third embodiment is provided with not only the laser units 30R, 30L but also the shade-type lamp units 40R, 40L. Accordingly, even in the case of a failure of the laser units 30R, 30L (for example, in the case of a failure causing the formation of only the low beam pattern to be allowed), the irradiation in the horizontal direction similar to the general high beam can be performed by the shade-type lamp units 40R, 40L.

The third embodiment can be combined with the second embodiment described above. In other words, even in this third embodiment, a part of the irradiation region of the shade-type lamp units 40R, 40L may be further illuminated based on the third laser irradiation pattern.

The preferred embodiments of the invention have been described above. The embodiments of invention are not limited to the embodiments described above. Various forms of modifications and replacements can also be added to the embodiments described above without departing from the scope of the invention.

For example, the dark region is formed by some of the LEDs of the LED units 20R, 20L being turned off in the first embodiment and the second embodiment described above. However, for instance, a similar dark region may be formed by separate infrared transmission filters being disposed with respect to the respective LED units 20R, 20L, each of the infrared transmission filters being configured to be switchable between an ON position and an OFF position, and the infrared transmission filters being switched to the ON position (a position of coming onto an optical path) with respect to some of the LEDs of the LED units 20R, 20L. In this case, a pedestrian detection function can be maintained in the dark region following the partial non-irradiation pattern. Accordingly, in this case, the near-infrared light projection devices 11R, 11L may be omitted in the first embodiment described above.

In the first embodiment and the second embodiment described above, the LED unit 20L (the same being applied to the LED unit 20R) is formed by the use of the array in which the plurality of LEDs are aligned in a line in the lateral direction. However, the formation may also be based on an array in which the plurality of LEDs are aligned in two or more lines in the lateral direction. In the example that is illustrated in FIG. 4A, for example, one LED may be newly disposed, in addition to the LEDs 231 to 240, at the same positions in the lateral direction with respect to each of the LEDs 231 to 240. In this case, a resolution of the dark region in the vertical direction can be increased by the state of turning on of the LED being controlled in a similar manner from LED to LED. Even in this case, the technology of this disclosure is applicable by the first laser irradiation pattern in which a part of the dark region is irradiated being determined as in the first embodiment and the second embodiment described above in a case where the resolution of the dark region is still insufficient.

In the first embodiment and the second embodiment described above, the LED irradiation-enabled regions of the LED unit 20R are regions respectively overlapping the LED irradiation-enabled regions A1 to A10 of the LED unit 20L. However, the respective LED irradiation-enabled regions of the LED unit 20R may also be set not to overlap the LED irradiation-enabled regions A1 to A10 of the LED unit 20L. In addition, the respective LED irradiation-enabled regions of the LED unit 20R may relatively change to positions not overlapping the LED irradiation-enabled regions A1 to A10 of the LED unit 20L in response to an AFS operation. In any of these cases, the technology of this disclosure is applicable by the first laser irradiation pattern in which a part of the dark region in the light distribution pattern formed by all the LED units 20R, 20L is irradiated being determined in the above-described manner.

In the first embodiment and the second embodiment described above, the laser irradiation-enabled region of the laser unit 30R is substantially the same as the laser irradiation-enabled region B1 of the laser unit 30L. However, the laser irradiation-enabled region of the laser unit 30R may differ from the laser irradiation-enabled region B1 of the laser unit 30L as well. In a case where the first laser irradiation pattern in which a non-overlapping region is irradiated or the like is determined in this case, only a single corresponding one of the laser units 30R, 30L realizes the irradiation.

In the first to third embodiments described above, the first image sensor 91 is the color camera that is provided with the infrared cut filter for an enhanced vehicle-in-front detection function. The invention is not limited thereto. For example, the first image sensor 91 may be a color camera lacking the infrared cut filter or may not be a color camera.

In the first to third embodiments described above, the second image sensor 92 is disposed so that the pedestrian detection function is enhanced. However, the second image sensor 92 may be omitted in a case where, for example, the pedestrian can be detected at a required accuracy level based on the image from the first image sensor 91 with the first image sensor 91 being provided with no infrared cut filter. Alternatively, the second image sensor 92 may be omitted along with the near-infrared light projection devices 11R, 11L in a case where the pedestrian is excluded from the irradiation suppression target object in the first embodiment and the third embodiment described above.

In the first to third embodiments described above, the near-infrared light projection devices 11R, 11L are disposed so that the pedestrian detection function is enhanced. However, the near-infrared light projection devices 11R, 11L may be omitted as well. In the second embodiment described above in particular, the pedestrian is excluded from the irradiation suppression target object, and thus the near-infrared light projection devices 11R, 11L may be omitted. The light from the LED units 20R, 20L (the same being applied to the shade-type lamp units 40R, 40L) includes a wavelength from visible light to near-infrared light, and thus the near-infrared image acquisition by the second image sensor 92 is possible. In other words, even in a case where the near-infrared light projection devices 11R, 11L are not disposed, the pedestrian in the irradiation region of the LED units 20R, 20L can be detected based on the near-infrared image from the second image sensor 92.

In the first to third embodiments described above, the near-infrared light projection devices 11R, 11L are disposed so that the pedestrian detection function is enhanced. However, a far-infrared light projection device may be disposed instead so that the pedestrian detection function for a farther region is enhanced in response to a relatively long irradiation distance of the laser units 30R, 30L.

In the first to third embodiments described above, the road surface drawing information generation unit 104 is disposed so that the information can be transmitted to the passenger by the use of the road surface drawing. However, the road surface drawing information generation unit 104 may be omitted.

In the first to second embodiments described above, a laser irradiation pattern (a fourth laser irradiation pattern) may be determined in which the entire laser irradiation-enabled region B1 or the region excluding the irradiation suppressed region in the entire laser irradiation-enabled region B1 is irradiated in a case where at least one of the LED units 20R, 20L fails. Even in the case of the failure of the LED units 20R, 20L, the visibility for a longer distance can be enhanced with the laser units 30R, 30L by the laser units 30R, 30L being controlled based on the fourth laser irradiation pattern similarly to the above in this case. The same is applied to a case where at least one of the shade-type lamp units 40R, 40L fails in the third embodiment described above.

In the first to third embodiments described above, the first image sensor 91 and the second image sensor 92 are used to acquire information on objects. However, a radar sensor that has a detection region in front of the host vehicle may be used, to acquire information on object, in addition to or instead of the first image sensor 91 and the second image sensor 92. Object information obtained from the radar sensor (a distance and a direction of the object with respect to the host vehicle) can represent a three-dimensional position (coordinate values in a spatial coordinate system) of the irradiation suppression target object. The coordinate value of the spatial coordinate system and the coordinate value of the coordinate system on the phosphor 34 (refer to FIG. 6A) can be coordinate-converted by the use of a predetermined conversion formula. In other words, a non-irradiation range (a range corresponding to the irradiation suppressed region) in the coordinate system on the phosphor 34 (refer to FIG. 6A) can be calculated based on each three-dimensional position in a set of reflection points of the irradiation suppression target object. Likewise, a range corresponding to the dark region in the coordinate system on the phosphor 34 (the dark region following the partial non-irradiation pattern or the split beam pattern) can also be derived by the use of the coordinate transformation matrix H described above via a two-dimensional coordinate system such as the coordinate system of the image (refer to FIG. 8B). Accordingly, the first laser irradiation pattern can be determined similarly to the above even in a case where the radar sensor is used. In a case where the radar sensor is used alone, the irradiation suppressed site detection units 1012, 1012A, 1012B according to the first to third embodiments described above and the face detection unit 1082 according to the second embodiment described above may be omitted.

In the first embodiment described above, some of the functions of the control device 7 may be realized by computers that are built into the first image sensor 91 and the second image sensor 92. For example, the first information generation unit 101 may be realized by the computers that are built into the first image sensor 91 and the second image sensor 92. The same is applied to the second embodiment and the third embodiment described above.

In the first and third embodiments described above, a bicycle rider may be handled in a similar manner to the pedestrian. In the second embodiment described above, the attention attraction target object may include the pedestrian and the bicycle rider. The bicycle rider can be detected based on the information from the second image sensor 92 as is the case with the pedestrian. In the second embodiment described above, an animal may be handled in a similar manner to the pedestrian as the attention attraction target object. In the case of the animal, the third laser irradiation pattern in which the entire animal including its face is irradiated may be determined. The animal can be detected based on the information from the second image sensor 92 as is the case with the pedestrian.

In the second embodiment described above, the third irradiation pattern determination unit 1053 determines the third laser irradiation pattern in which a site other than the pedestrian's face is irradiated and the third laser irradiation pattern in which the distant region is irradiated. However, the third irradiation pattern determination unit 1053 may determine only the third laser irradiation pattern in which a site other than the pedestrian's face is irradiated.

In the second embodiment described above, the predetermined irradiation target region corresponds to the region below the face of the pedestrian in the LED irradiation-enabled region including the pedestrian. The invention is not limited thereto. The predetermined irradiation target region may correspond to a region excluding the region of the pedestrian's face from the entire region of the pedestrian in the coordinate system of the image. In other words, the predetermined irradiation target region may correspond to a region relating to the pixel group relating to the pedestrian from which the pixel group relating to the pedestrian's face is excluded.

The shade-type lamp units 40R, 40L configured for identification are illustrated in FIGS. 20 to 22C. However, the configuration of the shade-type lamp units 40R, 40L is not limited to the illustration. For example, the shade-type lamp units may be separately provided with light sources for the high beam pattern and the split beam pattern and a light source for the low beam pattern.

In the example that is illustrated in FIG. 7, Step S706 may be executed after the execution of Step S710. Likewise, in the example that is illustrated in FIG. 16, Step S706 may be executed after the execution of Step S7101. Likewise, in the example that is illustrated in FIG. 23, Step S7063 may be executed after the execution of Step S7103.

What is claimed is:

1. A vehicle headlight device comprising:
a sensor acquiring information on an object in front of a host vehicle;
a first lighting irradiating a space in front of the host vehicle with light;
a second lighting different from the first lighting, the second lighting including:
a laser light source emitting laser light;
a movable mirror element reflecting the laser light in a front of the host vehicle; and
an actuator driving the movable mirror element; and
at least one processor configured to:
control a light distribution pattern formed by the light by the first lighting based on the information obtained by the sensor to form a dark region where an irradiation with the light by the first lighting is reduced, the dark region including an irradiation suppressed site, the irradiation suppressed site including at least a part of an irradiation suppression target object detected by the sensor;
set a laser light distribution pattern formed by the laser light by the second lighting, the laser light distribution pattern irradiating a region that is included in the dark region but not including the irradiation suppressed site; and
control the actuator such that the laser light is reflected according to the laser light distribution pattern, such that:
the dark region includes (i) the region and (ii) the irradiation suppressed site;
in the region, the irradiation with the light by the first lighting is reduced without reducing an irradiation with the laser light by the second lighting; and
in the irradiation suppressed site, the irradiation with the light by the first lighting and the irradiation with the laser light by the second lighting are both reduced.

2. The vehicle headlight device according to claim 1, wherein the at least one processor is configured to:
set an irradiation suppressed region based on the information obtained by the sensor, the irradiation suppressed region including the irradiation suppressed site;
set the light distribution pattern formed by the light by the first lighting such that the irradiation suppressed region is included in the dark region; and
set the laser light distribution pattern to irradiate the region, the region being included in the dark region but not including the irradiation suppressed region, such that:
the dark region includes (i) the region and (ii) the irradiation suppressed region;
in the region, the irradiation with the light by the first lighting is reduced without reducing the irradiation with the laser light by the second lighting; and
in the irradiation suppressed region, the irradiation with the light by the first lighting and the irradiation with the laser light by the second lighting are both reduced.

3. The vehicle headlight device according to claim 1, wherein
a resolution of the light by the first lighting is lower than a resolution of the laser light by the second lighting.

4. The vehicle headlight device according to claim 1, wherein
the movable mirror element is capable of pivoting about two axes, and
the two axes intersect with each other and are in a reflective surface of the movable mirror element.

5. The vehicle headlight device according to claim 1, wherein
the at least one processor is configured to set the laser light distribution pattern based on information of a navigation device of the host vehicle such that guide information is displayed on a road surface in front of the host vehicle.

6. The vehicle headlight device according to claim 1, wherein
the at least one processor controls the actuator such that the laser light is reflected to a part below a face of a person.

7. The vehicle headlight device according to claim 1, wherein
the at least one processor sets the laser light distribution pattern such that the laser light is also reflected to a distant region up to a predetermined height from a horizontal line in an area irradiated with the light by the first lighting.

8. The vehicle headlight device according to claim 1, wherein:
the first lighting includes a plurality of light-emitting diodes; and
the at least one processor forms the dark region by turning off one or more of the plurality of light-emitting diodes.

9. The vehicle headlight device according to claim 8, wherein
the plurality of light-emitting diodes are placed in a line in a lateral direction.

10. The vehicle headlight device according to claim 1, wherein the at least one processor is configured to
detect the irradiation suppressed site, and
set an irradiation suppressed region based on a result of the irradiation suppressed site detection.

11. The vehicle headlight device according to claim 1, wherein
the irradiation suppression target object includes a preceding car and an oncoming car, the irradiation suppressed site of the preceding car is a rear glass of the preceding car, and the irradiation suppressed site of the oncoming car is a front windshield glass of the oncoming car.

12. The vehicle headlight device according to claim 1, wherein
the irradiation suppression target object includes a person, and the irradiation suppressed site of the person is a face of the person.

* * * * *